US008836981B2

(12) United States Patent
Takahashi

(10) Patent No.: US 8,836,981 B2
(45) Date of Patent: Sep. 16, 2014

(54) APPARATUS, SYSTEM, AND METHOD OF OUTPUT DISTRIBUTION, AND RECORDING MEDIUM STORING OUTPUT DISTRIBUTION CONTROL PROGRAM

(75) Inventor: Teruaki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 13/541,026

(22) Filed: Jul. 3, 2012

(65) Prior Publication Data

US 2013/0027744 A1    Jan. 31, 2013

(30) Foreign Application Priority Data

Jul. 26, 2011  (JP) ................. 2011-163340

(51) Int. Cl.
*G06K 15/00*   (2006.01)
*H04L 12/931*  (2013.01)

(52) U.S. Cl.
CPC ..................................... *H04L 49/00* (2013.01)
USPC ........................................ 358/1.15; 358/1.6

(58) Field of Classification Search
CPC .... G06Q 30/02; G06Q 30/0601; H04L 63/08; H04L 1/00; H04L 12/00; H04L 49/00; H04M 2201/40; H04M 2203/655; H04M 2201/42
USPC ................................................. 358/1.15, 1.6
See application file for complete search history.

(56) References Cited

U.S. PATENT DOCUMENTS

| | | | |
|---|---|---|---|
| 5,872,847 A * | 2/1999 | Boyle et al. | 713/151 |
| 2005/0043855 A1* | 2/2005 | Kimura | 700/237 |
| 2008/0010354 A1* | 1/2008 | Sasaki et al. | 709/206 |
| 2009/0003333 A1* | 1/2009 | Davison et al. | 370/389 |
| 2011/0051185 A1 | 3/2011 | Takahashi | |
| 2011/0051736 A1* | 3/2011 | Takenouchi | 370/401 |
| 2011/0058208 A1 | 3/2011 | Takahashi | |
| 2011/0205959 A1* | 8/2011 | Aalto et al. | 370/328 |
| 2011/0276493 A1* | 11/2011 | Graham et al. | 705/53 |
| 2012/0185580 A1* | 7/2012 | Detert | 709/223 |
| 2012/0240207 A1* | 9/2012 | Kato | 726/7 |
| 2012/0254368 A1* | 10/2012 | Sasaki et al. | 709/219 |

FOREIGN PATENT DOCUMENTS

JP   2010-157208   7/2010
JP   2010-286873   12/2010

* cited by examiner

*Primary Examiner* — Jerome Grant, II
(74) *Attorney, Agent, or Firm* — Oblon, Spivak, McClelland, Maier & Neustadt, L.L.P.

(57) ABSTRACT

An output distribution system extracts user-specific information from job data that is generated in response to an output request, obtains terminal-specific information that identifies a terminal that is associated with a user specified by user-specific information, and transmits drawing data of the job data to an output destination determined based on the identified terminal.

11 Claims, 15 Drawing Sheets

FIG. 4A

| SECOND PROTOCOL SESSION ID | TERMINAL NAME | TOKEN ID | LOGIN USER NAME | FIRST PROTOCOL SESSION |
|---|---|---|---|---|
| SESSION 1 | TERMINAL X | TOKEN A | USER A | SESSION 1 |

FIG. 4B

| SECOND PROTOCOL SESSION ID | TERMINAL NAME | TOKEN ID | LOGIN USER NAME | FIRST PROTOCOL SESSION ID |
|---|---|---|---|---|
| SESSION 2 | TERMINAL Y | TOKEN A | USER A | SESSION 1 |

FIG. 5A

| TERMINAL NAME | LOGIN USER NAME |
|---|---|
| TERMINAL X | USER A |
| TERMINAL Z | USER B |
| ⋮ | ⋮ |

FIG. 5B

| TERMINAL NAME | PRINTER NAME |
|---|---|
| TERMINAL X | PRINTER A |
| TERMINAL Z | PRINTER B |
| ⋮ | ⋮ |

FIG. 6A

| TERMINAL NAME | LOGIN USER NAME | PRINTER NAME |
|---|---|---|
| TERMINAL X | USER A | PRINTER A |
| TERMINAL Y | USER A | PRINTER B |
| TERMINAL Y | USER B | PRINTER C |
| ⋮ | ⋮ | ⋮ |

FIG. 6B

| VIRTUAL PRINTER DRIVER NAME | TERMINAL NAME | PRINTER NAME |
|---|---|---|
| VIRTUAL PRINTER DRIVER A | TERMINAL X | PRINTER A |
| ⋮ | ⋮ | ⋮ |
| VIRTUAL PRINTER DRIVER B | TERMINAL Z | PRINTER B |
| ⋮ | ⋮ | ⋮ |

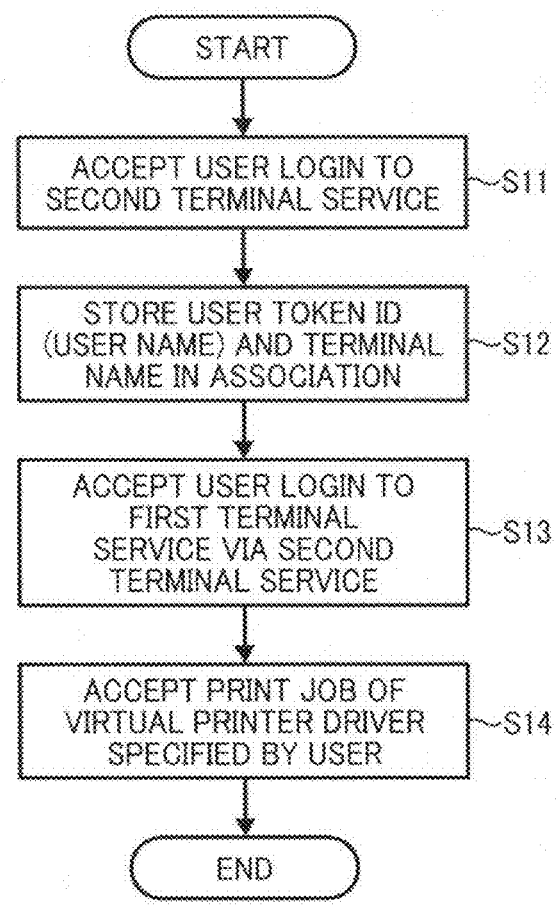

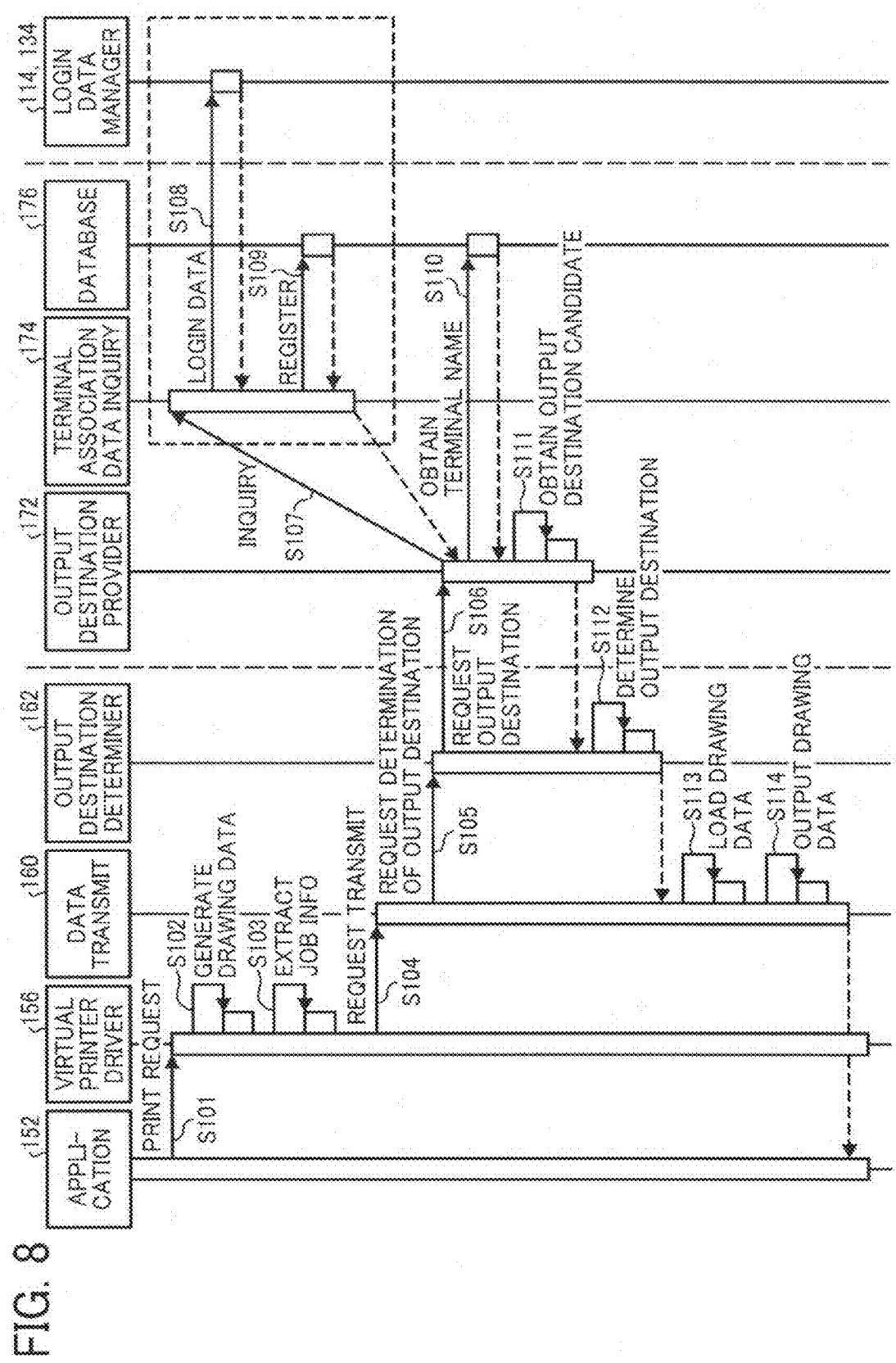

FIG. 15A

| FIRST PROTOCOL SESSION | TERMINAL NAME | TOKEN ID | LOGIN USER NAME |
|---|---|---|---|
| SESSION 1 | TERMINAL X | TOKEN A | USER A |

FIG. 15B

| FIRST PROTOCOL SESSION ID | TERMINAL NAME | TOKEN ID | LOGIN USER NAME |
|---|---|---|---|
| SESSION 2 | TERMINAL Z | — | USER A |

APPARATUS, SYSTEM, AND METHOD OF OUTPUT DISTRIBUTION, AND RECORDING MEDIUM STORING OUTPUT DISTRIBUTION CONTROL PROGRAM

CROSS-REFERENCE TO RELATED APPLICATIONS

This patent application is based on and claims priority pursuant to 35 U.S.C. §119 to Japanese Patent Application No. 2011-163340, filed on Jul. 26, 2011, in the Japan Patent Office, the entire disclosure of which is hereby incorporated by reference.

BACKGROUND

1. Field of the Invention

The present invention generally relates to an output distribution system, and more specifically to an apparatus, system, and method of output distribution each capable of specifying an output destination and distributing data for output to the specified output destination, and a recording medium storing an output distribution control program.

2. Description of the Related Art

In the recent office environment, a plurality of image forming apparatuses such as multi-functional peripherals (MFPs) and laser printers is connected through a network to a plurality of client terminals through a server to form an output distribution system. As described in Japanese Patent Application Publication Nos. 2010-286873A and 2010-157208A, when a request for printing is received from a user at a client terminal, the server of the output distribution system may specify an image forming apparatus, which is associated with the user or the client terminal of the user, as an output destination for print output.

The server of the background output distribution system is not always capable of correctly specifying an output destination using information indicating the user or the client terminal. For example, the recent office environment may include a thin client environment in which the user at a thin client terminal remotely accesses a desktop environment provided by the server through a terminal server. When the server communicates with the thin client terminal through the thin client environment, the server may not be able to obtain information indicating the thin client terminal currently operated by the user such that the output destination cannot be correctly identified.

SUMMARY

In view of the above, one aspect of the present invention is to provide an apparatus, system, and method of output distribution each capable of specifying a client terminal currently operated by a user, even when the client terminal includes a thin client terminal that remotely accesses a desktop environment provided by a server through an environment having a different architecture from that of the server. The apparatus, system, and method of output distribution are each capable of further specifying an output destination for processing a request by the user based on the specified client terminal. Any one of the output distribution apparatus, system, and method may be implemented in the form of an output distribution control program stored in a recording medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A is an example data structure of login data managed by a second login data manager of the output distribution system of FIG. 3, which represents a session established by a client terminal operated by a user;

FIG. 4B is an example data structure of login data managed by the second login data manager of the output distribution system of FIG. 3, which represents a session established by a client terminal operated by the user of FIG. 4A, which is different from the client terminal of FIG. 4A;

FIG. 5A is an example data structure illustrating a terminal association data table stored in a terminal association data database, managed by a database server of the output distribution system of FIG. 3;

FIG. 5B is an example data structure illustrating an output destination association file, managed by the database server of the output distribution system of FIG. 3;

FIG. 6A is an example data structure illustrating an output destination association file, managed by the database server of the output distribution system of FIG. 3;

FIG. 6B is an example data structure illustrating an output destination association file, managed by the database server of the output distribution system of FIG. 3;

FIG. 7 is a flowchart illustrating operation of accepting a print job requested by a user through a thin client environment, performed by an application distribution server of the output distribution system of FIG. 3, according to an example embodiment of the present invention;

FIG. 8 is a data sequence diagram illustrating operation of determining an output destination for processing a print job, performed by the application distribution server and a database server of the output distribution system of FIG. 3, according to an example embodiment of the present invention;

FIG. 15A is an example data structure of login data managed by a first login data manager of the output distribution system of FIG. 3, which represents a session established by a client terminal operated by a user; and FIG. 15B an example data structure of login data managed by a first login data manager of the output distribution system of FIG. 3, which represents a session established by a client terminal operated by a user.

Figure 1:
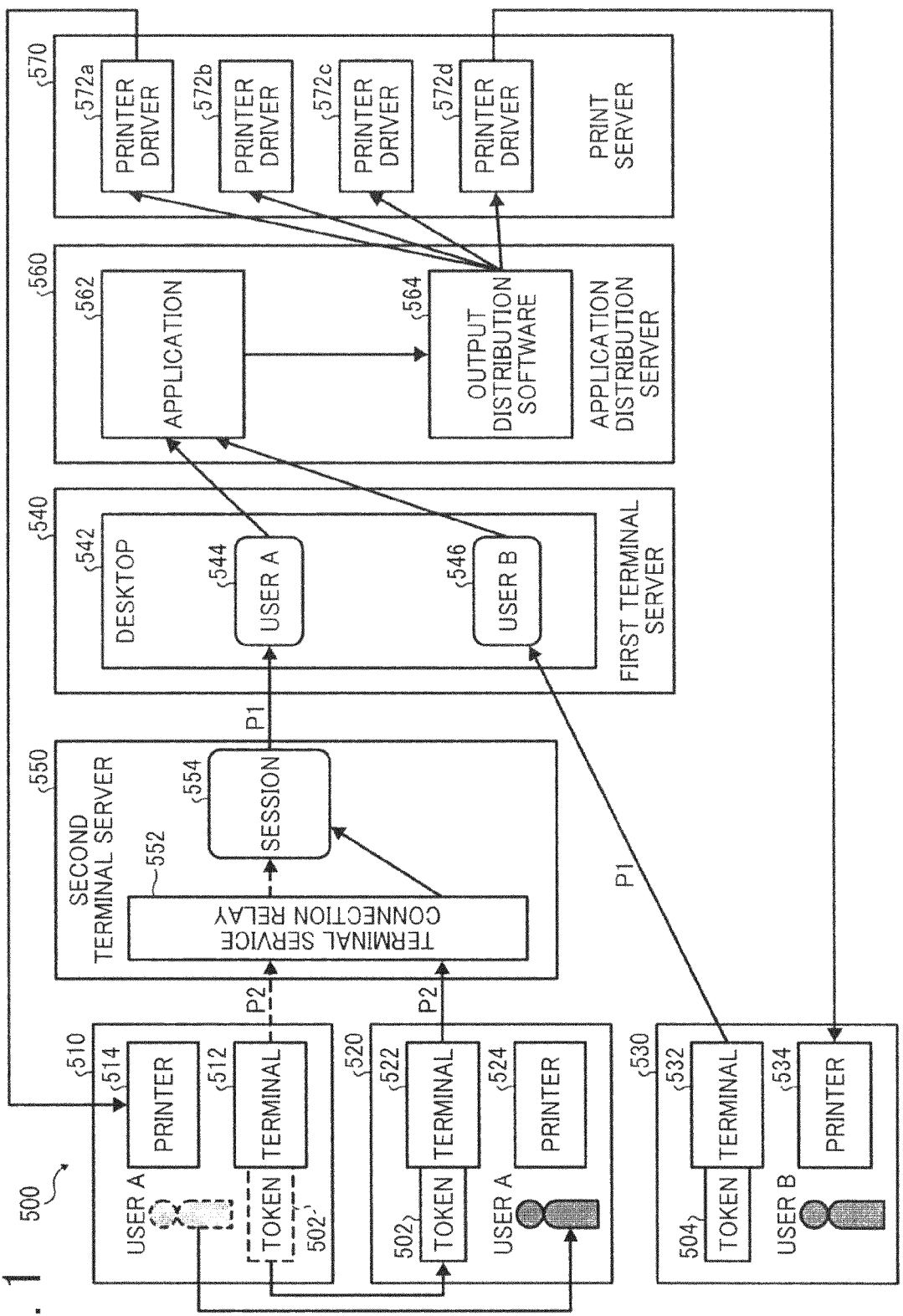
FIG. 1 is a schematic block diagram illustrating a functional structure of a background output distribution system, which is applied to an office environment having a thin client environment.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, a background output distribution system 500 is explained to illustrate one or more problems in applying the background output distribution system 500 to an office environment having a thin client terminal. The background output distribution system 500 of FIG. 1 includes a plurality of client terminals 512, 522, and 532 ("terminal") each operated by an end user, and a plurality of printers 514, 524, and 534. The terminal 512 and the printer 514 are located at a first location site 510. The terminal 522 and the printer 524 are located at a second location site 520. The terminal 532 and the printer 534 are located at a third location site 530.

The background output distribution system 500 further includes a first terminal server 540, an application distribution server 560, and a print server 570.

The first terminal server 540 provides a first terminal service through a first remote desktop 542, which may be referred to as a public desktop. The first remote desktop 542 is accessible using a first remote connections protocol P1 ("first protocol P1"). The application distribution server 560 is installed with application software 562 ("application 562") and output distribution software 564. The application distribution server 560 functions as a public application server, which distributes functions provided by the application 562 and the output distribution software 564, to the first remote desktop 542 of the first terminal server 540. The print server 570 includes a plurality of printer drivers 572a, 572b, 572c, and 572d. Using the printer drivers 572a to 572d, the print server 570 manages the printers 514, 524, and 534 in the output distribution system 500 to perform printing according to a printing request by the end user.

In example operation, a user B inserts a token 504 into the terminal 532 to cause the terminal 532 to directly connect with the first terminal server 540 using the first protocol P1, and logs in the first remote desktop 542 provided by the first terminal server 540 as the user B 546. For example, the token 504 may be implemented by an IC card assigned to the user B, which may be read by a card reader provided with the terminal 532. The first terminal server 540 is able to identify the terminal 532 that has established direct connections with the first terminal server 540, and the login user B who has logged in the first remote desktop 542 through the terminal 532. In such case, when a print job is requested by the user B, the output distribution software 564 of the application distribution server 560 specifies an output destination that is associated with the terminal 532 that the user B 546 is currently logged on. Assuming that association data indicating the association between the printer 534 and the terminal 532 is previously prepared, the output distribution software 564 specifies the printer 534 as an output destination for processing the print job requested by the user B at the terminal 532.

It is now assumed that the background output distribution system 500 of FIG. 1 further includes a second terminal server 550 having architecture different from that of the first terminal server 540. The second terminal server 550 provides a second terminal service to the terminal through a second desktop environment based on a second remote connections protocol P2 ("second protocol P2"). The second terminal server 550 includes a terminal service connection relay 552, which relays connections of the terminal with the first terminal service of the first terminal server 540, through the second terminal service of the second terminal server 550. If the user connects with the first terminal server 540 via the second terminal server 550, the output distribution software 564 is not able to correctly specify an output destination for processing a print job requested by the user since the output distribution software 564 is not able to identify the terminal currently operated by the user.

Assuming that a user A at the first location site 510 inserts a token 502 assigned to the user A into the terminal 512 to log in the first terminal service through the second terminal server 550, as the user A 544. In such case, the terminal 512 establishes a session with the second terminal server 550 according to the second protocol P2, and the second terminal server 550 establishes a session 554 with the first terminal server 540 according to the first protocol P1. More specifically, the terminal service connection relay 552 connects between the second protocol-based session and the first protocol-based session to allow the terminal 512 to access the first terminal service provided by the first terminal server 540.

Assuming that the user A at the first location site 510 removes the token 502 from the terminal 512, moves to the second location site 520, and inserts the token 502 into the terminal 522 of the second location site 520. The second protocol-based session established between the terminal 512 and the second terminal server 550 is disconnected. The terminal 522 newly establishes a session with the second terminal server 550 according to the second protocol P2. The terminal service connection relay 552, after completing login process of the user A at the terminal 522, connects the newly established second protocol-based session and the existing first protocol-based session 554 to allow the terminal 522 to access the first terminal service provided by the first terminal server 540. In this manner, the user A, who moves to the second location site 520, is able to continuously work on the same first remote desktop 542 provided by the first terminal server 540 without interrupting or repeating the work that has been performed at the previous location site 510.

Since the first protocol-based session 554 is being kept even after the terminal that the user A is using is changed from the terminal 512 to the terminal 522, the first terminal server 540 is not able to recognize that the terminal 522 is a terminal that the user A 544 is currently using. In such case, when a print job is requested by the user A, the output distribution software 564 specifies the printer 514, which is previously associated with the terminal 512 located at the first location site 510, as an output destination for processing the print job requested by the user A at the location site 520.

As described above, if the user logs in the first remote desktop 542 through the second terminal server 550, the output distribution software 564 is not able to specify an output destination that is associated with a specific terminal that the login user is currently using. While the above-described example illustrates the case where the user logs in the first remote desktop 542 through one terminal server, the similar problem may arise when the user logs in the first remote desktop 542 through a plurality of terminal servers or a plurality of terminal services.

Figure 2:
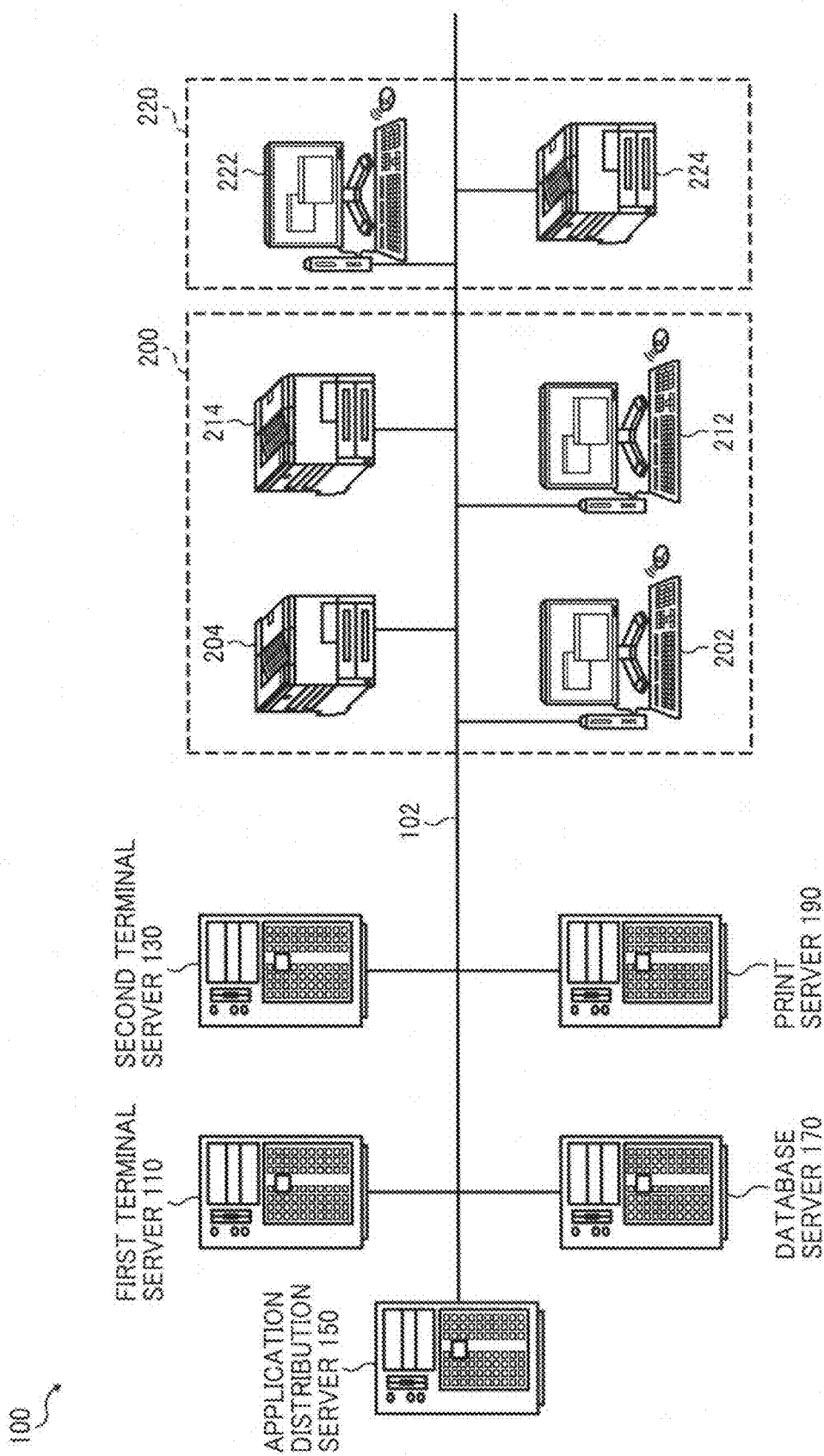
FIG. 2 is an illustration of a network configuration of an output distribution system, according to an example embodiment of the present invention.

To solve the above-described and other problems in the background output distribution system 500, an output distribution system 100 of FIG. 2 is provided with a function of identifying a terminal that is currently operated by a login user, even when the login user accesses a function of the output distribution software through one or more different terminal servers or terminal services.

FIG. 2 illustrates an example network configuration of the output distribution system 100. The output distribution system 100 includes a group of servers 110, 130, 150, 170, and 190, a plurality of client terminals ("terminals") 202, 212, and 222, and a plurality of printers 204, 214, and 224, which are connected through a network 102.

In one example configuration, the terminals 202, 212, and 222, and the printers 204, 214, and 224 are provided at one or more user location sites, for example, in the office environment. Any desired number of servers 110 to 190 may be provided at one or more user location sites or at one or more services provider location sites. Further, the user or services provider location sites may be all located within one country, or may be partly located within one country. For example, the user location sites may be located within the United State, while any one of the servers may be located out of the United States as long as the servers provide services through a desktop environment to the end user at the user location site.

The user may operate any one of the terminals 202, 212, and 222 to use various services provided by the group of servers 110 to 190 in the output distribution system 100. In this example, the terminals 202, 212, and 222 (collectively referred to as the "terminal") each operate as a thin client terminal, which may be based on any thin client solution that is available. Examples of thin client solution include, but not limited to, the Windows (Registered Trademark) terminal service offered by Microsoft, the Sun Ray (Registered Trademark) service offered by Oracle, the Citrix XenApp (Registered Trademark) service and the Citrix XenDesktop (Registered Trademark) service respectively offered by Citrix.

In case the terminal is implemented by a thin client terminal, the terminal includes a processor including a microprocessor unit (MPU) and a work memory of the MPU, a peripheral interface, and a network interface. The peripheral interface is connected to an input/output device such as a keyboard, a mouse, a microphone, a speaker, or a display. Alternatively, the input/output device may be integrated into a body of the terminal, for example, in the form of a touch panel screen. The network interface allows the terminal to communicate with at least one server in the output distribution system 100 using any desired wired or wireless network. Further, in this example, the terminal is provided with a reader, which reads out data from a token, such as an IC card inserted by the user. In alternative to the IC card, any desired authentication system may be used to allow the user to log in the output distribution system. The terminal is installed with thin client software providing a thin client solution, such that the terminal has architecture different from a personal computer (PC) operating on the operating system. Depending on a type of thin client solution, the terminal may be further provided with browser software that allows the user at the terminal to use the terminal service using a browser. For example, the thin client terminal may have a hardware structure described below referring to FIG. 14, but without a hard disk 20.

Alternatively, the terminal may be implemented by an information processing apparatus such as a PC or a workstation, which may be referred to as a thick or fat client terminal. In such case, the terminal may have a hardware structure described below referring to FIG. 14. Alternatively, the terminal may be implemented by a portable device such as a personal digital assistance (PDA), a smart phone, a digital camera, car navigation system, etc.

The printers 204, 214, and 224 each function as an output destination that outputs a print output according to a user request. In addition to or in alternative to the printer, any other desired image forming apparatus such as a multifunctional peripheral (MFP) capable of performing a plurality of image processing and image forming functions may be used. For example, the MPF is provided with a scanner, a facsimile, a printer, and an interface to send or receive data over a network. For the descriptive purposes, any image forming apparatus that may function as an output destination is referred to as a remote printer.

In this example, the group of servers 110 to 190, the terminals 202, 212, and 222, and the remote printers 204, 214, and 224 are connected through the network 102 to exchange data using a packet communication based on the TCP/IP protocol. Examples of the network 102 include, but not limited to, wired network such as 1000Base-TX Ethernet (Registered Trademark) and wireless network such as the IEEE802.11. The network 102 may be implemented by a local area network (LAN), and/or a wide area network (WAN) such as the Internet, which may be preferably protected under the secure environments such as a virtual private network (VPN).

Still referring to FIG. 2, the group of servers 110 to 190 includes a first terminal server 110, a second terminal server 130, an application distribution server 150, a database server 170, and a print server 190. The servers 110 to 190 are each implemented by a computer having a structure illustrated in FIG. 14, such as a PC. More specifically, the computers are respectively installed with specialized software that respectively cause the computers to operate as the first terminal server 110, the second terminal server 130, the application distribution server 150, the database server 170, and the print server 190.

The first terminal server 110 provides a first terminal service to the user through the terminal, using a first remote connections protocol P1 ("first protocol P1"). The second terminal server 130 provides a second terminal service to the user through the terminal, using a second remote connections protocol P2 ("second protocol P2"). In this example, the terminals 202, 212, and 222 are each implemented as a thin client terminal such that the terminal allows the user to perform various operations using the first terminal service provided by the first terminal server 110 and/or the second terminal service provided by the second terminal server 130. The second terminal server 130 is provided with a terminal service connection relay 132 (FIG. 3), which allows the terminal to access the first terminal service of the first terminal server 110 via the second terminal server 130. Alternatively, the terminal may directly access the first terminal service of the first terminal server 110 by establishing a session with the first terminal server 110 based on the first protocol P1.

Examples of the first or second terminal service include, but not limited to, a Windows-based terminal service provided by the Windows (Registered Trademark) server 200X, a Sun Ray-based terminal service provided by the Sun Ray (Registered Trademark) server, and a Citrix XenDesktop-based terminal service provided by the Citrix (Registered Trademark) XenDesktop (Registered Trademark). In this example, the terminal service is any desired service, which provides a desktop environment to the thin client terminal through the network 102 so as to allow the terminal to use various applications or data stored in the terminal server or a server accessible by the terminal server.

In this example, it is assumed that the first terminal server 110 provides the Windows-based terminal service as the first terminal service. The first terminal server 110 is installed with specialized software that causes the first terminal server 110 to have a functional structure, or functional modules, described below referring to FIG. 3. More specifically, a processor, such as the MPU 12 and the memory (FIG. 14), of the first terminal server 110 operates in cooperation with a first terminal service program to have at least a manager that manages a remote desktop 112, and a first login data manager 114.

Further, the first terminal service program may be provided in part. For example, a component of the first terminal service program may be additionally installed onto the first terminal server 110 to have the first login data manager 114.

The second terminal server 130 provides the Sun Ray-based terminal service as the second terminal service. More specifically, the second terminal server 130 is installed with specialized software that causes the second terminal server 130 to have a functional structure, or functional modules, described below referring to FIG. 3. More specifically, a processor, such as the MPU 12 and the memory (FIG. 14), of the second terminal server 130 operates in cooperation with a second terminal service program to have at least a manger that manages a session such as the terminal service connection relay 132, and a second login data manager 134. In this example, the terminal service connection relay 132 is implemented as a Sun Ray Connector for Windows OS. For the first protocol P1 to be used for remotely connecting the first terminal server 110, a remote desktop protocol (RDP) may be used. For the second protocol P2 to be used for remotely connecting the second terminal server 130, an application link protocol (ALP) may be used. More specifically, the terminal service connection relay 132 provides a connections relay function to connect between a first protocol-based session and a second protocol-based session.

Further, the second terminal service program may be provided in part. For example, a component of the second terminal service program may be additionally installed onto the second terminal server 130 to have the second login data manager 134.

Figure 3:
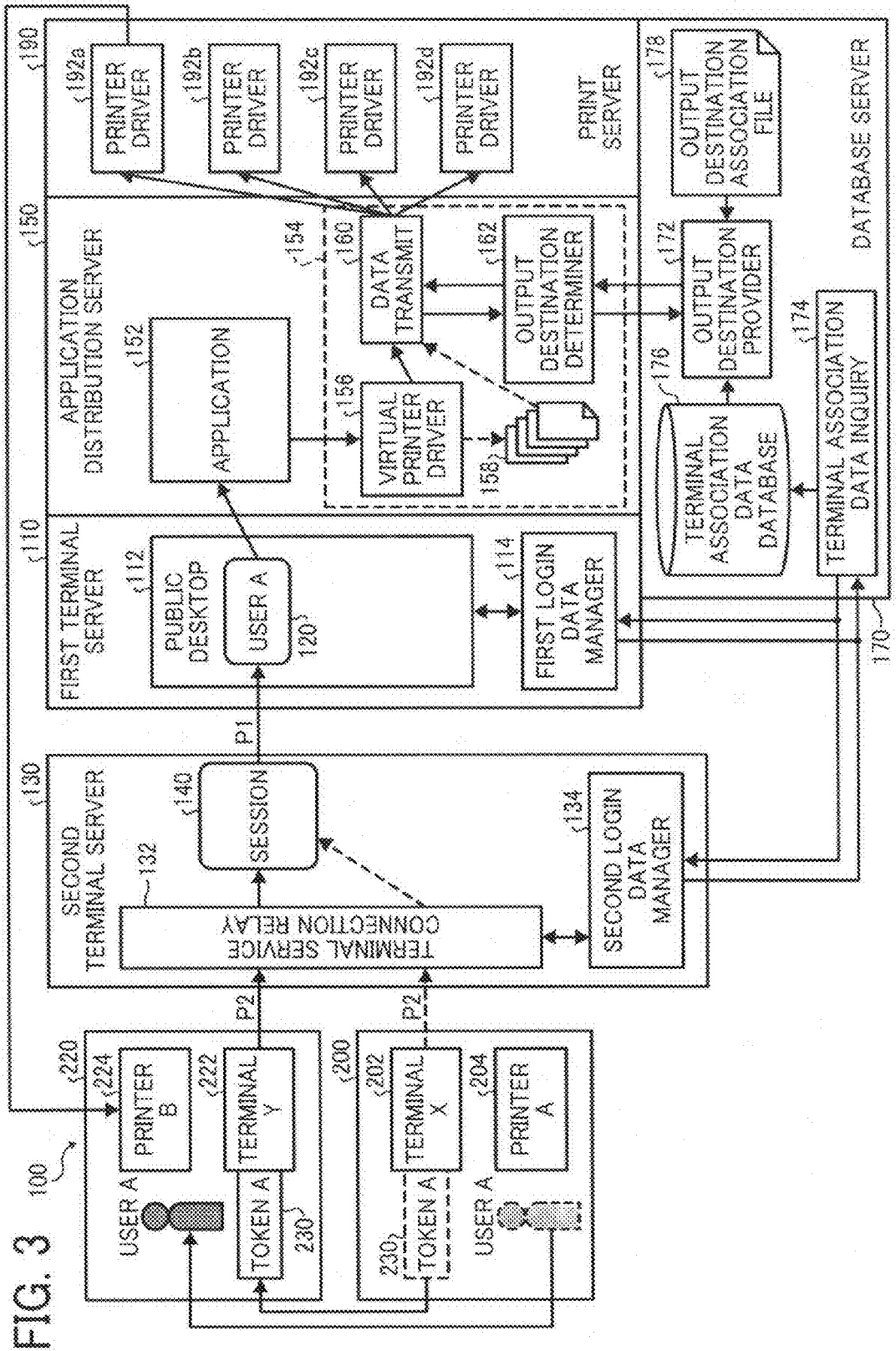
FIG. 3 is a schematic block diagram illustrating a functional structure of the output distribution system of FIG. 2, when it is applied to an office environment having a thin client environment.

Referring to FIGS. 2 and 3, the application distribution server 150 functions as a public application server, which distributes various functions provided by application software 152 ("application 152") to a public desktop environment provided by the first terminal server 110. In this example, the remote desktop 112 functions as a public desktop, which is accessible by the end user. The application distribution server 150 is further installed with output distribution software 154, which causes the application distribution server 150 to provide a function of specifying an output destination for print output when a user request for printing is received through the application 152. The application distribution software 154, when deployed, causes a processor of the application distribution server 150 to have a functional structure, or functional modules, described below referring to FIG. 3.

The database server 170 provides a function of providing information to be used for determining an output destination, to the output distribution software 154 that operates on the application distribution server 150. The database server 170 is installed with specialized software, which may be referred to as an output destination information providing program, which causes the database server 170 to have a functional structure, or functional modules, described below referring to FIG. 3.

The printer server 190 is installed with a plurality of printer driver programs ("printer drivers") 192a to 192d (FIG. 3). Using the printer drivers 192, the print server 190 manages the plurality of printers 204, 214, and 224 on the network 102, each functioning as an output destination of the output distribution system 100 for outputting a print output according to a print request.

In example operation, in response to a print request received through the terminal, the application distribution server 150 communicates with the database server 170 to request for information indicating a specific remote printer ("selected remote printer") as an output destination for processing the print request. The application distribution server 150, which obtains information indicating the selected remote printer, calls a printer driver 192 that manages the selected remote printer, and transmits drawing data generated based on the print request to the selected remote printer. As the printer driver 192 is being called, the printer driver 192 of the print server 190 generates a drawing command based on the drawing data, and sends the drawing command to cause the selected remote printer to output a print output. The remote printer forms an image on a recording sheet according to the drawing command to output the printed sheet as a print output.

In this example, the output distribution system 100 selects a remote printer, which is located at the same location site where the terminal being currently operated by the user is located, or at a location closely located to the location site where the terminal being currently operated by the user is located. In order to select a remote printer that is located closely to the terminal currently operated by the user, the output distribution system 100 previously stores output destination association data. For example, as described below referring to FIGS. 3, 5B, 6A and 6B, the remote printers of the output distribution system 100 are each associated with the registered terminals of the output distribution system 100, for example, based on information regarding the location where the terminals and the remote printers are each located.

In this example illustrated in FIG. 2, the area 200 indicated by a dotted line represents one location site, and the area 220 indicated by a dotted line represents another location site that is remotely located from the area 200. Accordingly, the terminals 202 and 212, and the remote printers 204 and 214 are located in the area 200. The terminal 222 and the remote printer 224 are located in the area 220. In such case, the terminals 202 and 212 are associated with the printers 204 and 214 as they are all located at the same area 200. The terminal 222 is associated with the printer 224 as they are located at the same area 220. With the output destination association data indicating the association between the terminal and the printer, the output distribution system 100 is able to specify an output destination for print output as long as the terminal currently operated by the end user is specified.

The output distribution system 100 of FIG. 2 may be implemented in various other ways such that the number of servers, the number of terminals, and the number of remote printers in each area are not limited to the example illustrated in FIG. 2. For example, any desired number of terminals or remote printers may be provided at one location site. The output distribution system 100 may thus include a location site including only a terminal or only a remote printer. Further, any one of the servers 110 to 190 may be provided at any location site.

Figure 14:
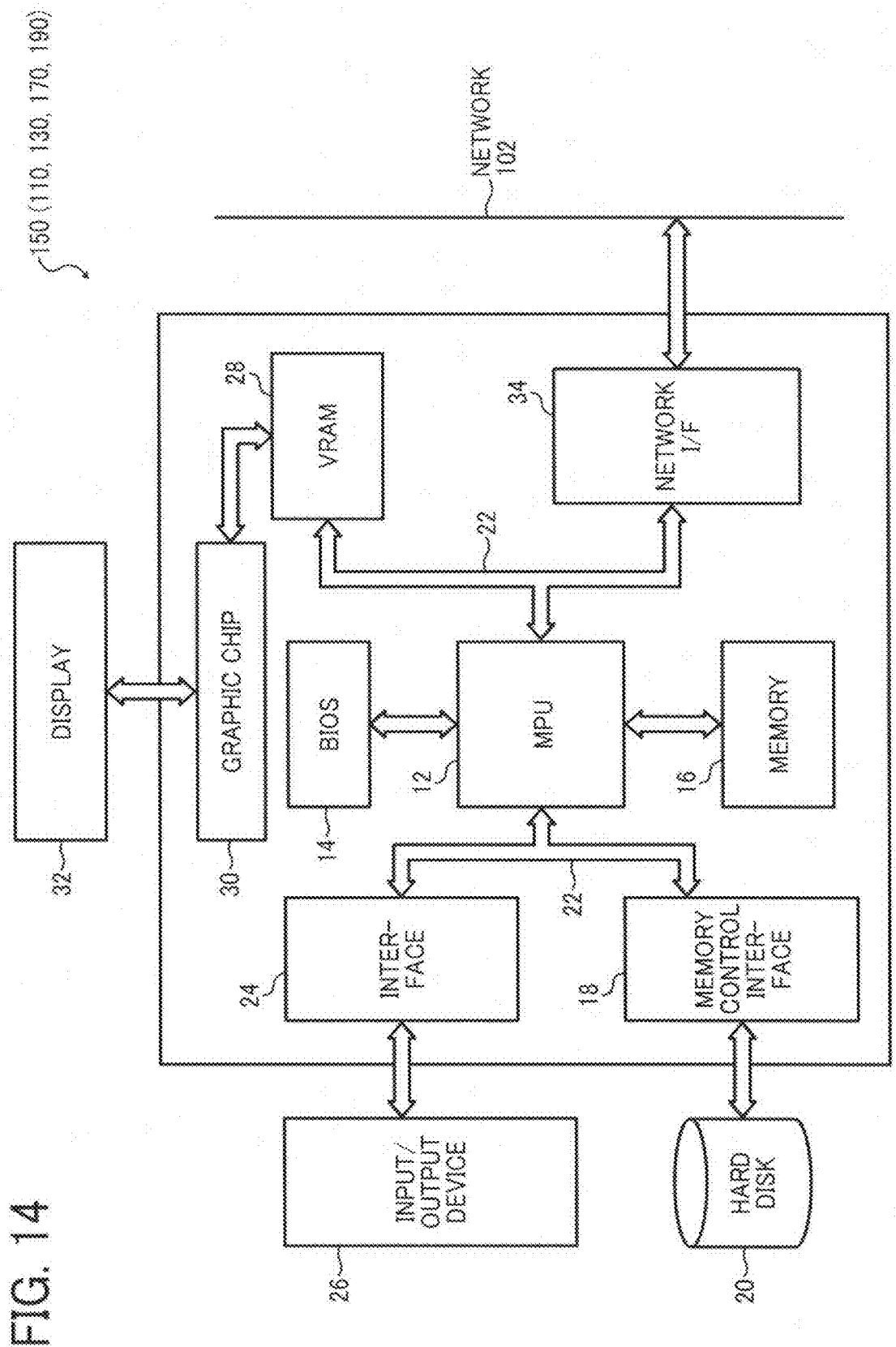
FIG. 14 is a schematic block diagram illustrating a hardware structure of any one of a first terminal server, a second terminal server, the application distribution server, the database server, and a print server, of the output distribution system of FIG. 2.

Referring now to FIG. 14, a hardware structure of the application distribution server 150 is explained according to an example embodiment of the present invention.

The application distribution server 150 includes the microprocessor unit (MPU) 12, a nonvolatile memory 14 storing therein a Basic Input Output System (BIOS), and a work memory 16 of the MPU 12. When executed, the MPU 12 reads out the BIOS from the nonvolatile memory 14 to perform system diagnosis and management of an input/output device 26.

The application distribution server 150 further includes a memory control interface 18, an interface 24, a volatile random access memory (VRAM) 28, a graphic chip 30, a network interface (I/F) 34, the input/output device 26, a display 32, and the hard disk 20. As illustrated in FIG. 14, a peripheral device such as the input/output device 26, the display 32, and the hard disk 20 may be separately provided from a main body of the application distribution server 150.

The MPU 12 is connected to the memory control interface 18 through an internal bus 22. In response to an input/output request from the MPU 12, the memory control interface 18 writes in or reads out data with respect to the hard disk 20. The memory control interface 18 may be implemented by any desired interface that manages reading or writing data with respect to the hard disk 20, in compliance with the standards such as Integrated Device Electronics (IDE), AT Attachment (ATA), SATA, and eSATA. The MPU 12, which is connected to the interface 24 through the internal bus 22, communicates with the input/output device 26 through the interface 24 to receive a user request. The interface 24 may be implemented by a serial or parallel interface in compliance with the standards such as USB or IEEE1164. The input/output device 26 includes a keyboard, a mouse, a microphone, or any other peripheral device.

The graphic chip 30 processes video signals in response to an instruction received from the MPU 12 to cause the display 32 to display various data. The display 32 may be implemented by any desired display such as a liquid crystal display (LCD) or an organic light emitting display. The MPU 12 is connected to the network I/F 34 such as a network interface card (NIC) through the internal bus 22. Through the network I/F 34, the application distribution server 150 communicates with the outside apparatus through the network 102.

The application distribution server 150 may be provided with any desired memory such as a nonvolatile RAM or a SD card, which may be freely removed from the application distribution server 150. For the descriptive purposes, any desired memory that is accessible under control of the MPU 12 is referred to as a memory.

The MPU 12 of the application distribution server 150 reads out various programs including the output distribution software 564 from the memory such as the nonvolatile memory 14, the hard disk 20, the nonvolatile RAM or the SD card, to deploy the programs on a memory area of the work memory 16. The MPU 12 causes the application distribution server 150 to perform various functions or operations according to the read programs under the operating system (OS). Examples of the OS include, but not limited to, the Windows (Registered Trademark), UNIX (Registered Trademark), LINUX (Registered Trademark), and Solaris (Registered Trademark).

In this example, the first terminal server 110, the second terminal server 130, the database server 170, and the print server 190 each have a hardware structure substantially similar to that of FIG. 14.

Referring now to FIG. 3, a functional structure of the output distribution system 100 is explained according to an example embodiment of the present invention. For the illustrative purposes, the terminal 212 and the remote printer 214 of FIG. 2 are omitted from FIG. 3.

The first terminal server 110 includes the manager that manages the first remote desktop 112, and the first login data manager 114. The first remote desktop 112, which may be referred to as a first desktop environment of the first terminal server 110, is accessible through a session based on the first protocol P1. As described above referring to FIG. 1, any user, who has a token, is capable of logging in the remote desktop 112 directly through a client terminal using the first protocol P1 to access the first terminal service provided by the first terminal server 110. In this example, the first terminal service includes the Windows-based service.

The first login data manager 114 manages login data with respect to the remote desktop 112. The first terminal server 110 identifies a login user who is currently logged in the remote desktop 112, and a terminal that accesses the first terminal server 110 based on the first protocol P1. The first login data manager 114 manages login data, which associates a login user who is currently logged in the remote desktop 112, and a terminal that accesses the first terminal server 110, for example, by registering the login data in any desired memory of the first terminal server 110 as the user is logged on. The first login data manager 114 may provide login data indicating association between the login user and the terminal of the first terminal service, to the outside such as the database server 170 via an interface such as the network I/F 34 through the network 102. The first login data manager 114 may be implemented by a process or a daemon that manages the first terminal service.

The second terminal server 130 provides the second terminal service, such as the Sun Ray-based service, through a second desktop environment. The second terminal service of the second terminal server 130 includes the terminal service connection relay 132, which allows a terminal to access the first terminal service provided by the first terminal server 110 through the second terminal server 130. The terminal service connection relay 132 functions as a client of the first terminal service, which allows the terminal to access the first terminal service via the second terminal service provided by the second terminal server 130. In this example, the second desktop environment allows the user to use functions of the terminal service connection relay 132 to access the first remote desktop 112 of the first terminal service. More specifically, the user accesses the terminal, such as the terminal 202 or 222, which provides a client function based on the second protocol P2 using a token. The user at the terminal logs in the remote desktop 112 using the relay connections function provided by the second desktop environment of the second terminal server 130, to perform various operations using the application 152 and the output distribution software 154 that are provided through the remote desktop 112.

The second terminal server 130 further includes the second login data manager 134, which manages login data with respect to the second desktop environment provided by the second terminal server 130. The second terminal server 130 identifies a login user who is currently logged in the second terminal service using the second protocol P2, and the terminal currently operated by the login user. The second login data manager 134 manages login data, which associates between the login user who is currently logged in the second terminal service, and the terminal currently operated by the login user, for example, by registering the login data in any desired memory of the second terminal server 130 as the user is logged on. The second login data manager 134 may further provide the login data indicating the association between the login user and the terminal to the outside through an interface such as the network I/F 34 through the network 102. The second login data manager 134 may be implemented by a process or a daemon for managing the second terminal service.

Further, in this example, the user accesses the terminal using a token, which is assigned to each user. The second terminal server 130 manages a token ID of the token and a user name of the user in association with each other, for each one of the users who are registered in the output distribution system 100. For example, user related data indicating the association between the token ID and the user name for each of the registered may be stored in a memory in a manner that is manageable by the second terminal server 130. Using this user related data, the second terminal server 130 allows the user, who inserts the token into the thin client terminal, to automatically access the second terminal service with the user name of the user that is associated with the token ID.

The user is able to further access the first terminal service of the first terminal server 110, using the connections relay function provided by the second terminal server 130, with a user name of the user. The user name of the user, which is used for accessing the first terminal service, may be defined differently from the user name of the user that is used for accessing the second terminal service. For simplicity, in the following examples, it is assumed that the same user name is used for accessing the first terminal service and the second terminal service. In such case, the second terminal server 130 identifies the login user, who accesses the second terminal service, by obtaining the user name of the login user that is associated with the token ID. With a request for establishing a first protocol-based session, the second terminal server 130 sends the user name of the login user to the first terminal server 110. The first terminal server 110 may store the obtained user name in association with a session ID of the newly established session. The first terminal server 110 identifies the login user, who accesses the first terminal service through the second terminal service, based on the user name of the login user that is obtained by the second terminal server 130.

In case a different user name is used for the same user, for each of the first and second terminal services, a directory server may be additionally provided in the output distribution server 100 to store data indicating association between the user name of the user for accessing the first terminal service and the user name of the user for accessing the second terminal service. For example, the second terminal server 130 obtains a user name of the login user at the terminal, which is associated with a token ID of the token inserted into the terminal by the login user, using the user related data. With a request for establishing the first protocol-based session, the second terminal server 130 sends the obtained user name to the first terminal server 110. The first terminal server 110 requests the directory server for a user name of the login user for accessing the first terminal service, which is associated with the obtained user name of the login user for accessing the second terminal service. The first terminal server 110 stores the user name of the login user for accessing the first terminal service, in association with a session ID of the newly established session.

FIGS. 4A and 4B (FIG. 4) each illustrate a data structure of the login data managed by the second login data manager 134 according to an example embodiment of the present invention. Each entry of the login data table of FIG. 4 is created as a second protocol-based session is established with the terminal. The login data table of FIG. 4 stores, for each entry, a second protocol session ID for identifying a second protocol-based session, a terminal name of the terminal that directly accesses the second terminal server 130 to have the second protocol-based session, a token ID of a token assigned to a user ("login user") who operates the terminal, and a login user name of the login user. The login data table of FIG. 4 further stores a first protocol session ID for identifying a first protocol-based session, which is established between the second terminal server 130 and the first terminal server 110 for the login user according to a user request for accessing the first remote desktop 112.

For example, referring to FIGS. 3 and 4A, assuming that the user A inserts a token A 230 into the terminal X 202 to access the first remote desktop 112, the second terminal server 130 establishes a second protocol-based session having a session ID "SESSION 1" with the terminal X 202 using the second protocol P2. In such case, the second login data manager 134 registers the second protocol session ID "SESSION 1", the terminal "X", and the token "A", respectively, in the second protocol session ID, the terminal name, and the token ID fields. Using the user related data indicating the association between a token ID and a user name of the registered user, the second login data manager 134 enters the user "A", which corresponds to the token ID "A", in the login user name field. The second login data manager 134 enters the first protocol session ID "SESSION 1" in the first protocol session ID field, which indicates the session 140 that is established between the second terminal server 130 and the first terminal server 110 for the login user.

Referring to FIGS. 3 and 4B, it is now assumed that the user A removes the token A 230 from the terminal X 202 to cause the terminal X 202 to end the second protocol-based session having the second protocol session ID "SESSION 1". The user A further moves to the location site 220, and inserts the token A 230 into the terminal Y 222 to request for access to the first remote desktop 112. The terminal Y 222 establishes a second protocol-based session having a second protocol session ID "SESSION 2" with the second terminal server 130 using the second protocol P2. In such case, the second login data manager 134 enters the second protocol session ID "SESSION 2", the terminal "Y", the token "A", and the user "A", respectively, in the second protocol session ID, the terminal name, the token ID, and the login user name fields. The first protocol session ID "SESSION 1" in the first protocol session ID field remains unchanged.

In alternative to identifying or managing the login user using the user name, the output distribution system 100 may identify or manage the login user using any other desired type of user specific information indicating the login user. For example, the login data or the related user data may store a user ID, which is uniquely assigned to each user, in association with the token ID. Further, in alternative to storing a token ID, the login data or the related user data may store any other desired type of authentication information to be used for authenticating the login user. For example, assuming that the user is authenticated using a password, the login data or the related user data may store a password, which is determined by each user, in association with the user specific information.

Further, in alternative to storing the terminal name of the terminal for each login user as illustrated in FIG. 4, the output distribution system 100 may store any other desired type of terminal specific information for identifying a specific terminal. Examples of the terminal specific information include, but not limited to, a terminal name of the terminal, a Media Access Control (MAC) address of the terminal, an Internet Protocol (IP) address of the terminal, a serial number of the terminal, and a UUID of the terminal.

As described above referring to FIG. 3, the first login data manager 114 manages login data regarding a login user with respect to the first remote desktop 112, for example, in the form of a login data table of FIG. 15A or 15B (FIG. 15). The login data table of FIG. 15 stores, for each entry that is created as a first protocol-based session is established, a first protocol session ID for identifying a first protocol-based session, a terminal name of the terminal that directly accesses the first terminal server 110 to have the first protocol-based session, a token ID of a token assigned to a user ("login user") who operates the terminal, and a login user name of the login user.

For example, in a substantially similar manner as described above referring to FIG. 1 for the user B, the user A may insert the token A 230 into the terminal X 202, and directly access the desktop 112 of the first terminal server 110 through establishing a session between the terminal X 202 and the first terminal server 110 using the first protocol P1. In such case, as illustrated in FIG. 15A, the first login data manager 114 stores a first protocol session ID "SESSION 1", a terminal name "X", a token ID "A", and a login user name "A", respectively, in the first protocol session ID, terminal name, token ID, login user name fields.

In another example, as described above referring to FIG. 3, the user A may insert the token A 230 into the terminal Y 222, and access the desktop 112 of the first terminal server 110 through establishing a session between the terminal Y 222 and the second terminal server 130 and a session between the second terminal server 130 and the first terminal server 110. In such case, as illustrated in FIG. 15B, the first login data manager 114 stores a first protocol session ID "SESSION 2", a terminal name "Z" of the second terminal server, and a login user name "A", respectively, in the first protocol session ID, terminal name, and login user name fields. The first login data manager 114 may store a token ID "A" in the token ID field, when the token ID of the user A is known. In the example case illustrated in FIG. 15B, the first terminal server 110 is not able to identify the terminal Y 222 that the user A is currently operating.

Referring back to FIG. 3, the application distribution server 150 includes the application software (application) 152 and the output distribution software 154. The application 152 includes any desired number or type of application software. Examples of the application 152 include, but not limited to, a document creation application, a spreadsheet application, and a presentation application. The application 152 is operated under control of the login user, who is currently logged on the remote desktop 112.

The output distribution software 154, which may be implemented by a group of software components, distributes a print job requested by the login user to an output destination, which is selected from a plurality of output destination candidates in the output distribution system 100. In response to an instruction received from the user through the terminal, the output distribution software 154 receives a print job from the application 152, and determines an output destination that is associated with the terminal currently operated by the user. The output distribution software 154 causes the output destination, which is a selected remote printer, to output a print output to process the print request.

More specifically, the output distribution software 154, when deployed, causes the MPU 12 (FIG. 14) and the memory to have a virtual printer driver 156, a data transmit 160, and an output determiner 162. In response to the call from the application 152, the virtual printer driver 156 receives data related to a print job ("job data") from the application 152, and starts processing the print job. When the virtual printer driver 156 receives the job data, the virtual printer driver 156 generates drawing data 158, page by page, based on the job data, and stores the drawing data 158 in a work memory area (such as the work memory 16 of FIG. 14) of the application distribution server 150.

The drawing data 158 may be generated in any desired data format including, for example, Enhanced Metafile (EMF), bitmap, Portable Document Format (PDF), or EXL Paper Specification (XPS). Assuming that the drawing data 158 is generated under the Windows-based system, the virtual printer driver 156 generates the drawing data 158 by causing a spooler to generate an EMF file and causing a print processor to divide the EMF file by a predetermined unit such as by a page and copy the EMF file in the work memory area.

The job data includes user specific information for identifying a user who requests the print job, such as a user name or a user ID of the login user requesting the print job. When the job data is received, the virtual printer driver 156 further extracts at least the user specific information from the job data as job related information. When generation of the drawing data 158 and extraction of the job related information (such as the user specific information) are completed, the virtual printer driver 156 notifies the data transmit 160 that generation of the drawing data and extraction of the job related information are completed. Together with notification, the printer driver 156 sends the user specific information to the data transmit 160.

The data transmit 160 sends the user specific information, which is received from the virtual printer driver 156, to the output destination determiner 162 to request for determination of an output destination to process the print job requested by the user. In response to the request, the data transmit 160 receives information indicating an output destination from the output destination determiner 162. When the data transmit 160 receives notification from the output destination determiner 162 indicating the specific output destination, the data transmit 160 calls one of the printer drivers 192a to 192d that corresponds to the remote printer specified as the output destination, and transmits the drawing data 158 to the specified remote printer using the called printer driver 192. The called printer driver 192 receives the drawing data 158, and causes the specified remote printer to output a print output according to the print request.

The output destination determiner 162 communicates with the database server 170 through the network 102 to send a request for output destination information indicating one or more output destination candidates, with the user specific information that is extracted from the job data. In response to the request, the output destination determiner 162 receives notification from the database server 170, which indicates one or more output destination candidates for the login user specified by the user specific information. The output destination determiner 162 selects an output destination from the output destination candidates that are obtained from the database server 170, and sends information indicating the selected output destination to the data transmit 160. In case only one output destination candidate is obtained from the database server 170, the output destination determiner 162 specifies the notified output destination candidate as an output destination. In case more than one output destination candidate is obtained from the database server 170, the output destination determiner 162 may request the user to select one of the output destination candidates to specify one output destination, for example, as described below referring to FIG. 12. In case an error is returned from the database server 170, the output destination determiner 162 may cause a display (such as the display 32 of FIG. 14) to display a list of output destination candidates that are available for use, and requests the user to select one of the output destination candidates to specify one output destination. In case an error is returned from the database server 170, in another example, the output destination determiner 162 may cause the display 32 to display an error message, for example, as described below referring to FIG. 10A or 10B.

Still referring to FIG. 3, the database server 170 includes an output destination provider 172, a terminal association data inquiry 174, a terminal association data database 176, and an output destination association file 178. More specifically, the database server 170, when deployed, causes the MPU 12 and the memory of FIG. 14 to have the above-described functional modules of FIG. 3. The terminal association data inquiry 174 sends an inquiry to the first login data manager 114 and the second login data manager 134, respectively, to request for the login data managed by the fist login data manager 114 and the login data managed by the second login data manager 134. The inquiry is sent either periodically, or non-periodically at any desired time such as when a request is received from the output destination determiner 162 of the application distribution server 150. In response to the inquiry, the terminal association data inquiry 174 obtains login data indicating the association between a login user who is currently logged on the first terminal service directly or via the second terminal service, and the terminal that the login user is currently using to access the first terminal service. The terminal association data inquiry 174 stores the login data in the terminal association data database 176, for example, in the form of table as terminal association data.

The terminal association data database 176 stores user specific information indicating a login user who is currently logged in the first terminal service, and terminal specific information for identifying a terminal currently operated by the login user, in association with each other. Examples of the terminal specific information include, but not limited to, a terminal name of the terminal, a Media Access Control (MAC) address of the terminal, an Internet Protocol (IP) address of the terminal, a serial number of the terminal, and a UUID of the terminal.

FIG. 5A illustrates an example data structure of a terminal association table, which is registered in the terminal association data database 176. The terminal association table of FIG. 5A stores a user name of the login user and a terminal name of the terminal currently operated by the user in association with each other. By referring to the terminal association data stored in the terminal association data database 176, the output destination provider 172 obtains the terminal name, which is associated with the login user name that is received from the output destination determiner 162 as the user specific information.

The output destination provider 172 refers to the terminal association data database 176 to specify a terminal that is associated with the user specific information obtained from the output destination determiner 162, and obtains one or more output destination candidates that are associated with the terminal using the output destination association file 178. The output destination provider 172 provides information indicating one or more output destination candidates for processing the print job to the output destination determiner 162.

FIG. 5B illustrates an example data structure of the output destination association file 178, which is implemented in the form of a table. The output destination association file 178 of FIG. 5B registers the terminal name of the terminal and the printer name of the remote printer in association with each other. In this example, it is assumed that the output destination association file 178 is previously registered, for example, based on information indicating the location of each of the terminals and each of the remote printers are located.

FIGS. 6A and 6B each illustrate other example data structures of the output destination association file 178. The output destination association file 178 of FIG. 6A registers the name of a remote printer ("PRINTER NAME") in association with the terminal name of a terminal and the login user name of a login user. With the output destination association file 178 of FIG. 6A, an output destination may be set for each one of the terminals, for each one of the users.

The output destination association file 178 of FIG. 6B registers the name of a remote printer ("PRINTER NAME") in association with a combination of the virtual printer driver name of a virtual printer and the terminal name of a terminal. The virtual printer driver name is used for identifying a specific virtual printer driver, when a plurality of components of output distribution software 154 is installed on the system. Using the output destination association file 178, an output destination may be set for each one of the virtual printer drivers, for each one of the terminals.

Alternatively, the output destination association file 178 may be formed in various other ways. For example, an output destination may be determined based on the terminal specific information of the terminal that requests the print job, which may be associated with various information regarding a print job such as print settings information, a document name of data to be printed, and a number of pages to be printed.

Further, in alternative to specifying a remote printer that is closely located to the login user who requests the print job, the output distribution system 100 may specify a remote printer that is closely located to a terminal currently operated by a specific user specified by the login user as a destination for print output. For example, the login user accessing the remote desktop 112 through a request thin client terminal may request the virtual printer driver 156 to output a print output at a remote printer that is closely located to a destination terminal of a specific user. In such case, the application 152 generates job data including destination information indicating a destination of the print job.

In case the destination of the print job is specified and included in the job data, an output destination may be determined based on a user of the destination and a terminal of the destination. In such case, even when the terminal of the destination accesses the remote desktop 112 via the second terminal server 130, the application distribution server 150 specifies a terminal that is associated with the user of the destination as the destination terminal, and determines an output destination that is associated with the destination terminal to output a print output.

In the above-described example, the output destination association file 178 of any one of FIGS. 5B, 6A, and 6B may be previously prepared by an administrator of the output distribution system 100. The output destination association file 178 may be implemented by any desired memory such as a removable memory that is removable from a PC functioning as the database server 170, or a hard disk that may be separately provided from the PC functioning as the database server 170.

Figure 9:
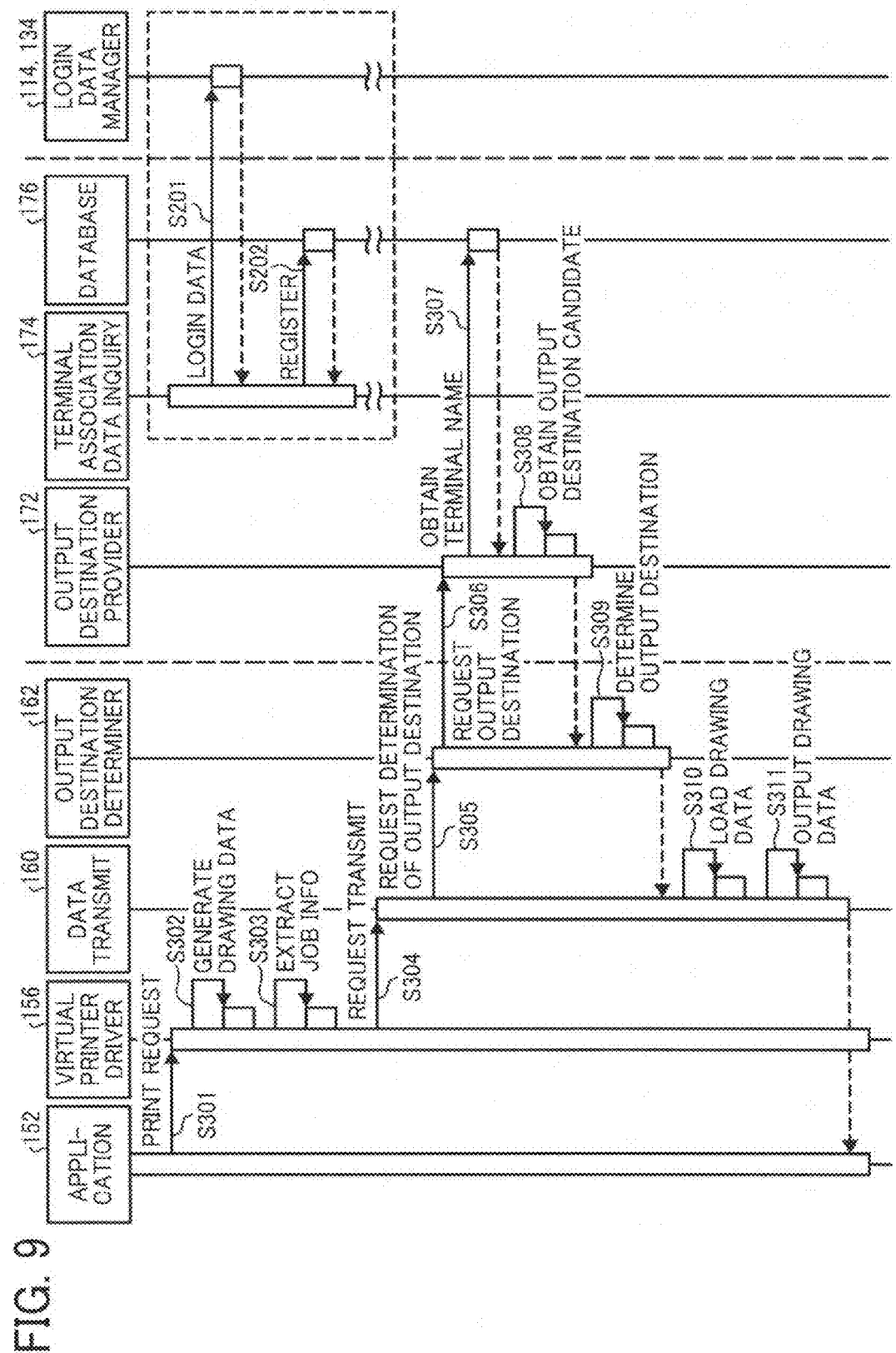
FIG. 9 is a data sequence diagram illustrating operation of determining an output destination for processing a print job, performed by the application distribution server and the database server of the output distribution system of FIG. 3, according to an example embodiment of the present invention.

Referring now to FIGS. 7, 8, and 9, operation of specifying an output destination to process a print job, performed by the output distribution system 100, is explained according to an example embodiment of the present invention. FIG. 7 is a flowchart illustrating operation of accepting a print job requested by the user who accesses the first terminal service via the second terminal server 130, performed by the output distribution system 100, according to an example embodiment of the present invention.

At S11, the second terminal server 130 accepts a login request of a user, which requests to log in the second terminal service provided by the second terminal server 130. More specifically, referring back to FIG. 3, the user A inserts the token A 230 into the thin client terminal to log in the second terminal service provided by the second terminal server 130. The thin client terminal establishes a second protocol-based session using the second protocol P2 with the second terminal server 130.

At S12, the second login data manager 134 of the second terminal server 130 stores user specific information for identifying the login user in association with terminal specific information for identifying the terminal that is currently operated by the login user. For example, assuming that the user A logs in the second terminal service, the second login data manager 134 stores a token ID of the token assigned to the login user and/or a user name of the login user, in association with the terminal name of the terminal currently operated by the login user, as described above referring to FIG. 4.

At S13, the first terminal server 110 accepts a login by the login user into the first terminal service via the second terminal service. The manager that manages the session 140 establishes a first protocol-based session using the first protocol P1 with the first terminal server 110. The terminal service connection relay 132 relays the second protocol-based session that is established between the thin client terminal and the second terminal server 130, and the first protocol-based session that is established between the second terminal server 130 and the first terminal server 110.

At S14, the application distribution server 150 accepts a print job, which is requested by the login user while specifying the virtual printer driver 156, and the operation ends to proceed to operation of FIG. 8 or 9. For example, the user at the thin client terminal, who accesses the remote desktop 112, may create a document using the application 152, and further specify the virtual printer driver 156 to request printing of the document. In response to the print request input by the login user, the application 152 sends the job data related to the requested print job to cause the virtual printer driver 156 to process the print job.

Referring now to FIGS. 8 and 9, operation of specifying an output destination, performed by the output distribution system 100, is explained according to example embodiments of the present invention.

FIG. 8 is a data sequence diagram illustrating operation of obtaining terminal association data indicating the association between the login user and a terminal, when the print request is received, performed by the output distribution system 100, according to an example embodiment of the present invention.

At S101, in response to the print request requested by the login user, the application 152 generates and sends job data to the virtual printer driver 156, which requests the virtual printer driver 156 to perform a print job based on the job data.

At S102, the virtual printer driver 156 generates drawing data 158, one page by one page, based on the job data, and stores the drawing data 158 in a work memory area (the work memory 16 of FIG. 14) of the application distribution server 150.

At S103, the virtual printer driver 156 extracts the job related information ("job info") from the job data, such as the user specific information for identifying the login user who requests the print job, such as a user name or a user ID of the login user.

At S104, the virtual printer drier 156 sends the user specific information to the data transmit 160 to request the data transmit 160 to transmit the drawing data 158 to an output destination that is associated with the login user specified by the user specific information.

At S105, the data transmit 160 sends the user specific information to the output destination determiner 162 to request for determination of the output destination that is associated with the user specific information.

At S106, the output destination determiner 162 sends the user specific information to the output destination provider 172 of the database server 170 to obtain the output destination information indicating one or more output destination candidates.

At S107, the output destination provider 172 requests the terminal association data inquiry 174 to send an inquiry to the first terminal server 110 and the second terminal server 130, respectively, to obtain login data indicating the association between the login user and the terminal currently operated by the login user.

At S108, the terminal association data inquiry 174 sends a request to the login data managers 114 and 134 on the terminal servers 110 and 130 through the network 102 to request for the login data indicating the association between the login user and the terminal.

In this example, the terminal association data inquiry 174 may obtain the login data for all of the login users who are currently logged in the first terminal service from the login data managers 114 and 134. More preferably, the terminal association data inquiry 174 obtains the login data indicating the association between the login user and the terminal for the print job to be processed, for example, by only obtaining the login data for the login user specified by the user specific information extracted from the job data. In such case, the terminal association data inquiry 174 sends the user specific information to the login data managers 114 and 134, respectively, to obtain the login data specific to the login user specified by the user specific information.

At S109, the terminal association data inquiry 174 registers the login data in the terminal association data database 176 as the terminal association data, and notifies the output destination provider 172 that the inquiry to the login data managers 114 and 134 is completed.

When notification is received, at S110, the output destination provider 172 refers to the terminal association data database 176 to obtain the terminal specific information that is associated with the user specific information that is extracted from the job data. For example, the terminal name of the terminal, which is associated with the user name, is obtained.

At S111, the output destination provider 172 refers to the output destination association file 178 using the terminal specific information obtained at S110, to obtain one or more output destination candidates that are associated with the terminal specific information. The output destination provider 172 sends a list of one or more output destination candidates as a search result to the output destination determiner 162 in response to the request received at S106.

At S112, the output destination determiner 162 specifies one output destination, which is selected from the list of one or more output destination candidates, and sends information indicating the specified output destination to the data transmit 160. In this example, it is assumed that the output destination determiner 162 receives only one output destination candidate such that the output destination determiner 162 specifies the output destination that is received as an output destination for processing the print job.

At S113, the data transmit 160 loads the drawing data 158 from the work memory area.

At S114, the data transmit 160 calls one of the printer drivers 192 that corresponds to the specified output destination, that is, the selected remote printer. The data transmit 160 further sends the drawing data 158 to the called printer driver 192 to request for printing of the drawing data 158 to perform the print job using the selected remote printer. The printer driver 192, which receives the drawing data 158, generates a drawing command in a format that is interpretable by the remote printer that is specified as the output destination, and outputs the drawing command to the remote printer to cause the remote printer to output a print output based on the drawing data 158 according to the drawing command. When printing is successfully completed, the printer driver 192 receives a processing result from the remote printer, and further sends the processing result to the data transmit 160. The data transmit 160 sends the processing result to the application 152 to report that the print request received at S101 is processed, and the operation ends.

In the above-described example, the terminal association data inquiry 174 obtains login data indicating association between the login user and the terminal from the login data managers 114 and 134, when a print request is received at the application 152. Alternatively, the terminal association data inquiry 174 may previously obtain login data indicating association between the login user and the terminal for each one of the login users, either periodically, or non-periodically at any desired time, for example, as described below referring to FIG. 9. More specifically, the database sever 170 performs S201 to S202 periodically or at any desired time according to a predetermined schedule, irrespective of whether a print job is received at the application 152. The application distribution server 150 and the database server 170 perform S301 to S311 when the print job is received at the application 152.

At S201, the terminal association data inquiry 174 sends an inquiry to the login data manager 114 and the login data manager 134, respectively, to request for the login data indicating the association between the login user who is currently logged in the first terminal service and the terminal currently operated by the login user, for each of the login users.

At S202, the terminal association data inquiry 174 registers the login data indicating the association between the login user and the terminal, which is obtained at 201, in the terminal association database 176 as the terminal association data, and the operation ends.

S301 to S311 are performed in response to a print request, which is sent by the user using the application 152 while specifying the virtual printer driver 156. S301 to S304 are performed in a substantially similar manner as described above referring to S101 to S104 of FIG. 8.

At S305, the data transmit 160 sends the user specific information to the output destination determiner 162 to request for determination of the output destination that is associated with the user specific information.

At S306, the output destination determiner 162 sends the user specific information to the output destination provider 172 of the database server 170 to obtain the output destination information indicating one or more output destination candidates that are associated with the user specific information.

At S307, the output destination provider 172 searches the terminal association data database 176 to obtain the terminal specific information that is associated with the user specific information.

At S308, the output destination provider 172 searches the output destination association file 178 using the terminal specific information that is obtained at S307 to extract one or more output destination candidates that are associated with the terminal specific information obtained at S307, and sends a list of one or more output destination candidates to the output destination determiner 162.

At S309, the output destination determiner 162 specifies one output destination, which is selected from the list of one or more output destination candidates, and sends information indicating the specified output destination to the data transmit 160. In this example, it is assumed that the output destination provider 172 sends information indicating one output destination candidate to the output destination determiner 162, and that the output destination determiner 162 specifies the output destination that is received as an output destination for processing the print job.

S310 to S311 are performed in a substantially similar manner as described above referring to S113 to S114 of FIG. 8, and the operation ends.

In the above-described examples, at S111 of FIG. 8 and at S308 of FIG. 9, it is assumed that the output destination provider 172 obtains only one output destination candidate using the terminal specific information that is associated with the user specific information, and sends information indicating one output destination candidate to the output destination determiner 162. In such case, at S112 of FIGS. 8 and S309 of FIG. 9, the output destination determiner 162 determines that the notified output destination candidate as an output destination for processing the print job.

Alternatively, the output destination provider 172 may obtain no output destination candidate, for example, due to an error in communication or when no entry is found.

Figure 10A:
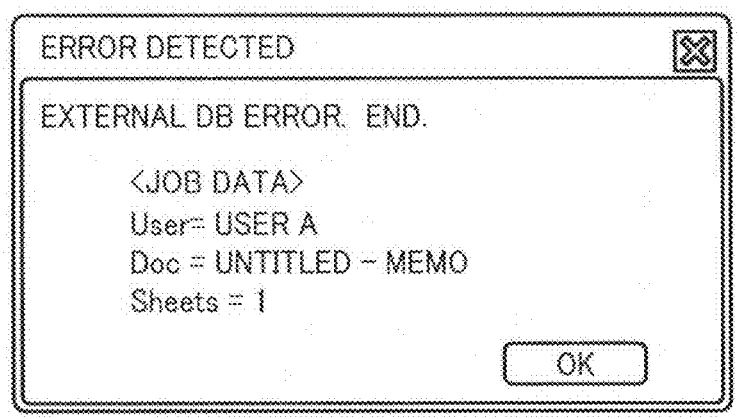
FIG. 10A is an example screen, which is displayed to a user at a client terminal when the output distribution system of FIG. 3 is not able to specify an output destination for processing a print job.

More specifically, in one example, the output destination determiner 162 of the application distribution server 150 may not be able to obtain a list of output destination candidates from the database server 170 through the network 102, due to an error such as an error in communicating with the database server 170. In such case, the output destination determiner 162 does not receive any result from the output destination provider 172, in response to the request sent at S106 or S306. When no result is received for a predetermined time period, the output destination determiner 162 determines that a communication error occurs, and causes a display at the thin client terminal to display an error screen as illustrated in FIG. 10A. FIG. 10A illustrates an example error screen, which is displayed to the login user when the output destination determiner 162 detects an error in communicating with the database server 170. Assuming that the login user A 120 requests the print job, the output destination determiner 162 causes the error screen of FIG. 10A to be displayed on the remote desktop 112 for the login user A 120 to notify the user A that a connection error with the database server 170 is detected.

Figure 10B:
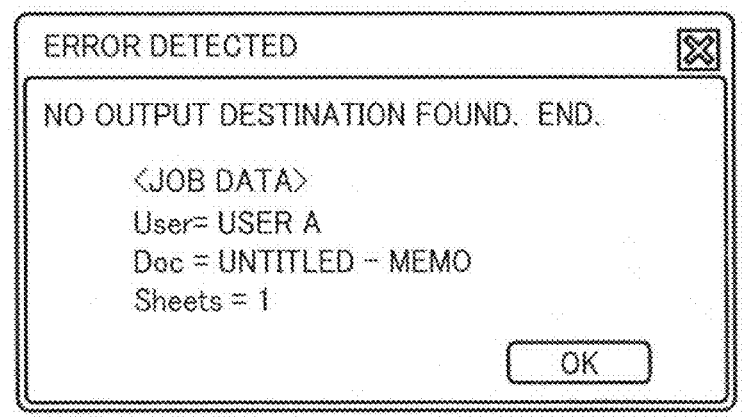
FIG. 10B is an example screen, which is displayed to a user at a client terminal when the output distribution system of FIG. 3 is not able to specify an output destination for processing a print job.

In another example, the output destination determiner 162 of the application distribution server 150 may not be able to obtain a list of output destination candidates from the database server 170 through the network 102, when the output destination provider 172 finds no entry in the output destination association file 178 that is associated with the obtained terminal name. When the output destination determiner 162 receives a result from the output destination provider 172 indicating that no output destination candidate is found at S111 or S308, the output destination determiner 162 causes a display at the thin client terminal to display an error screen as illustrated in FIG. 10B. In alternative to sending the result indicating that no entry is found, the output destination provider 172 may send a result indicating an error in obtaining an output destination candidate. Assuming that the login user A 120 requests the print job, the output destination determiner 162 causes the error screen of FIG. 10B to be displayed on the remote desktop 112 for the login user A 120 to notify the user A that no output destination for the terminal that is associated with the login user is found.

Figure 11:
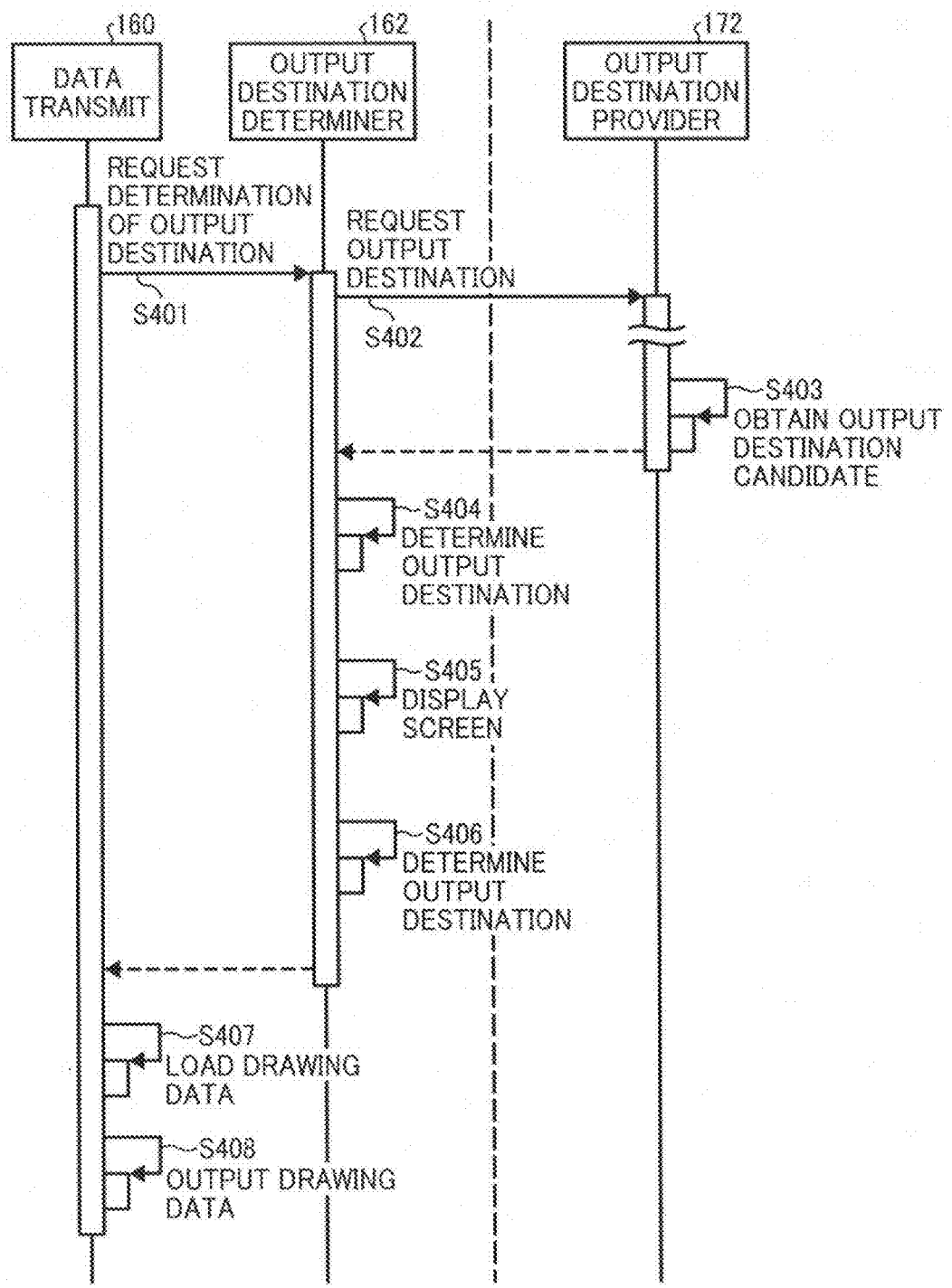
FIG. 11 is a data sequence diagram illustrating operation of determining an output destination for processing a print job when more than one output destination candidate is obtained, performed by the application distribution server and the database server of the output distribution system of FIG. 1, according to an example embodiment of the present invention.

In another example, the output destination determiner 162 of the application distribution server 150 may obtain more than one output destination candidate from the database server 170. FIG. 11 is a data sequence diagram illustrating operation of specifying an output destination when more than one output destination candidate is obtained, performed by the output distribution system 100, according to an example embodiment of the present invention.

Operation of FIG. 11 is performed when the application 152 accepts the print request, which is requested by the login user while specifying the virtual printer driver 156. As described above referring to FIG. 8, when the print request is received, the output distribution system 100 performs S101 to S104 of FIG. 8, which are omitted from FIG. 11, before performing S401 to S408 of FIG. 11.

At S401, the data transmit 160 sends the user specific information to the output destination determiner 162 to request for determination of the output destination that is associated with the user specific information.

At S402, the output destination determiner 162 sends the user specific information to the output destination provider 172 of the database server 170 to obtain the output destination information indicating one or more output destination candidates that are associated with the user specific information.

At S403, the output destination provider 172 searches the terminal association data database 176 to obtain the terminal specific information that is associated with the user specific information. The output destination provider 172 further searches the output destination association file 178 using the terminal specific information that is obtained to extract one or more output destination candidates that are associated with the terminal specific information. The output destination provider 172 sends a list of one or more output destination candidates to the output destination determiner 162. In this example illustrated in FIG. 11, it is assumed that more than one output destination candidate is obtained and sent to the output destination determiner 162.

At S404, the output destination determiner 162 analyzes the list of output destination candidates, and determines that there is more than one output destination candidate.

Figure 12:
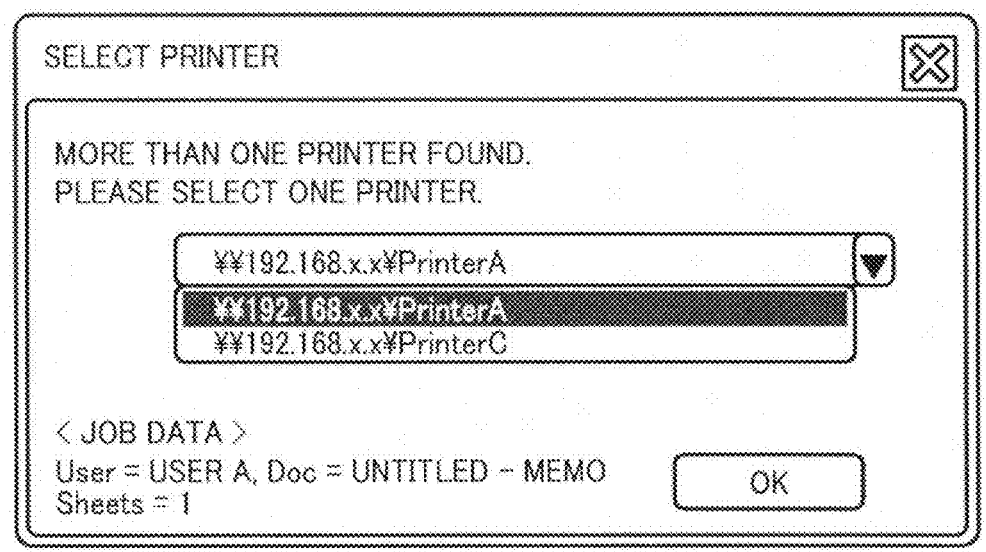
FIG. 12 is an example screen, which is displayed to a user at a client terminal to request the user to select one output destination for processing a print job, when the output distribution system of FIG. 3 obtains more than one output destination candidates.

At S405, the output destination determiner 162 requests the login user to select one of the output destination candidates as an output destination for processing the print job. More specifically, in this example, the output destination determiner 162 causes the display at the thin client terminal of the login user to display an output destination selection screen, which requests the login user to select one of the output destination candidates. FIG. 12 illustrates an example output destination selection screen, which is displayed to the login user. When the login user selects one of the remote printers, that is, the output destination candidates, from a pull-down menu and presses the "OK" key, the thin client terminal sends information indicating the selected remote printer to the application distribution server 150. At 5406, based on the user selection, the output destination determiner 162 determines the selected remote printer as an output destination for processing the print job.

S407 and S408 are performed in a substantially similar manner as described above referring to S113 and S114 of FIG. 8, and the operation ends.

In alternative to displaying an error screen as described above referring to FIG. 10A or 10B, the output distribution system 100 may request the login user to select one of a plurality of remote printers that are registered in the system when an error is detected. More specifically, in such case, the output destination determiner 162 obtains information indicating the available remote printers that are associated with the printer drivers 192a to 192d, and causes the display at the thin client terminal to display an output destination selection screen. The output destination selection screen may have appearance that is similar to the output destination selection screen of FIG. 12.

Referring now to FIGS. 3 and 4, operation of specifying an output destination for processing a print job, performed by the output distribution system 100 of FIG. 3, is explained according to an example embodiment of the present invention, while focusing on the problem illustrated above referring to FIG. 1.

Referring to FIG. 3, it is assumed that the user A at the location site 200 inserts the token A 230 into the terminal X 202 to access the first terminal service through the second terminal server 130. In such case, the second login data manager 134 registers login data as illustrated in FIG. 4A. The login data of FIG. 4A indicates that the user A logs in the first terminal service via the second terminal server 130, using the terminal X 202.

It is now assumed that the user A removes the token A 230 from the terminal X 202, moves to the location site 220, and inserts the token A 230 into the terminal Y 222. In such case, the second protocol-based session, which is established between the terminal X 202 and the second terminal server 130, is disconnected. The second terminal server 130 newly establishes a second protocol-based session with the terminal Y 222 using the second protocol P2. The terminal service connections relay 132 re-connects the newly established second protocol-based session with the existing first protocol-based session 140. The login data of FIG. 4B indicates that the user A logs in the first terminal service via the second terminal server 130 using the terminal Y 222.

As described above referring to FIG. 1, the first terminal server 110 is not able to identify the new terminal Y 222, which is currently operated by the login user A, since the login user A continues to login in as the login user A on the remote desktop 112. The second login data manager 134 manages the login data indicating the association between the login user and the terminal that is currently operated by the login user, as illustrated in FIGS. 4A and 4B. The database server 170 obtains the login data indicating the association between the login user A and the terminal Y 222 from the second login data manager 134, and specifies one or more output destination candidates using information for identifying the terminal Y 222. The database server 170 provides the output destination information indicating a list of one or more output destination candidates to the output distribution software 154.

The output distribution system 100 correctly identifies a terminal currently operated by a user even when a print job is requested by the user who is logged on the remote desktop 112, through the second terminal server 130, such that a print output is output by an output destination that is associated with the terminal currently operated by the user.

In the above-described example, the database server 170 manages the association between a login user and a terminal currently operated by the user, and the association between a terminal and an output destination. The application distribution server 150, which functions as a fat client terminal on which the application 152 and the output distribution software 154 operate, obtains the output destination information indicating one or more output destination candidates that is obtained using the terminal association data from the database server 170. Based on the output destination information, the application distribution server 150 distributes a print job to an output destination specified or selected using the output destination information.

In the above-described example, the output destination determiner 162 requests the output destination provider 172 for a list of one or more output destination candidates, regardless of whether or not the output distribution software 154 is able to obtain the user specific information and the terminal specific information for the print job. In some cases, however, the output distribution software 154 is able to obtain the user specific information and the terminal specific information without sending an inquiry to the database server 170. For example, when the thin client terminal directly accesses the first terminal server 110, the application distribution server 150 is capable of identifying the login user and the terminal.

Figure 13:
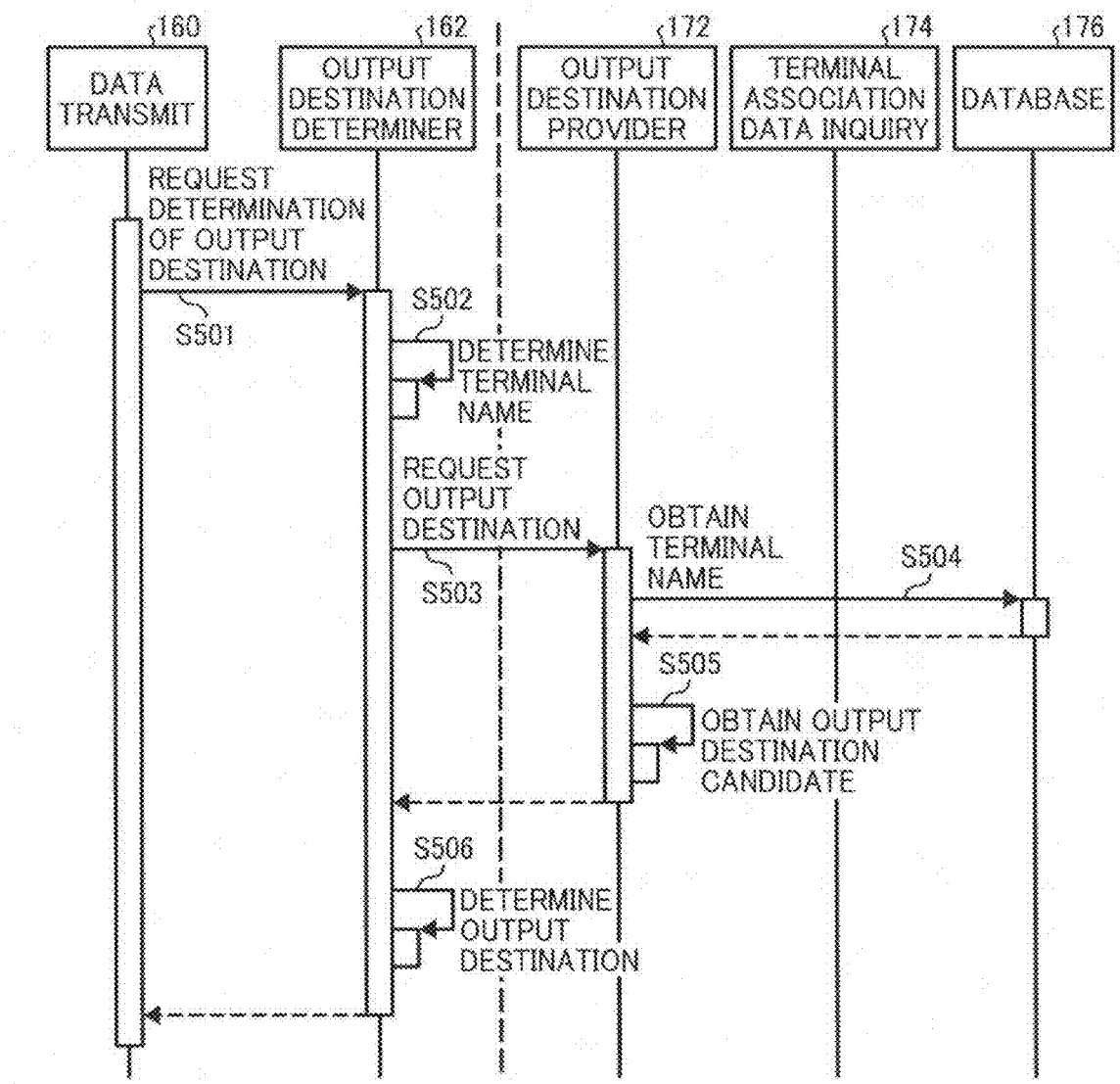
FIG. 13 is a data sequence diagram illustrating operation of determining an output destination for processing a print job, performed by the application distribution server and the database server of the output distribution system of FIG. 3, according to an example embodiment of the present invention.

Referring now to FIG. 13, operation of specifying an output destination, performed by the output distribution system 100, is explained according to an example embodiment of the present invention. In this example, the output distribution software 154 firstly determines whether the user specific information and the terminal specification information are available, without sending an inquiry to the database server 170. When it is determined that the user specific information and the terminal specification information are not available, the output distribution software 154 sends an inquiry to the output destination provider 172.

Operation of FIG. 13 is performed when the application 152 accepts the print request, which is requested by the login user while specifying the virtual printer driver 156. As described above referring to FIG. 8, when the print request is received, the output distribution system 100 performs S101 to S104 of FIG. 8, which are omitted from FIG. 13, before performing S501 to S506 of FIG. 13.

At S501, the data transmit 160 sends the user specific information to the output destination determiner 162 to request for determination of the output destination that is associated with the user specific information.

At S502, the output destination determiner 162 determines whether the output distribution software 154 is able to obtain the terminal specific information that is associated with the login user specified by the user specific information. For example, it is determined whether a terminal name of the terminal currently operated by the login user can be obtained. In one example, the application distribution server 150 communicates with the first terminal server 110 to obtain login data indicating the association between the login user and the terminal by referring to the login data table of FIG. 15A or 15B. When the terminal name is not obtained, the output destination determiner 162 determines that the terminal specific information that is associated with the login user is not obtained. Further, in another example, it may be determined that the terminal name is not obtained when the terminal name other than the terminal name of the second terminal server 130 is not obtained.

When it is determined that the terminal specific information is not obtained at S502, the operation proceeds to S503. At S503, the output destination determiner 162 sends the user specific information to the database server 170 to request for output destination information indicating one or more output destination candidates that are associated with the user specific information, for example, in a substantially similar manner as described above referring to FIG. 8.

S503 to S506 are performed in a substantially similar manner as described above referring to S110 to S112 of FIG. 8.

At 5502, when it is determined that the terminal specific information is obtained before sending an inquiry to the database server 170, the output destination determiner 162 searches an output destination association file, which is previously stored in the output distribution software 154, to obtain one or more output destinations that are associated with the terminal specific information. The output destination determiner 162 further selects one output destination for processing the print job.

In this manner, the application distribution server 150 obtains the terminal specific information that is associated with the user specific information for the login user who directly accesses the first terminal server 110, without accessing the database server 170. This suppresses data traffic on the network, thus reducing occurrence of an error in communicating with the database server 170.

In the above-described examples of the output distribution system 100 of FIG. 3, the first terminal server 110, the second terminal server 130, the application distribution server 150, the database server 170, and the print server 190 are implemented by respective machines that are independent from one another, for example, as PCs. Alternatively, functions or components of the first terminal server 110, the second terminal server 130, the application distribution server 150, the database server 170, and the print server 190 may be combined to be operated on the same machine.

For example, in some embodiments, the application distribution server 150 includes a plurality of computing devices, e.g., a server cluster, that are configured to communicate with each other over any type of communications link, including a network, a shared memory, etc. to collectively perform the processes disclosed herein. Similarly, the database server 170 can include a plurality of computing devices that are configured to communicate with each other.

Moreover, the application distribution server 150 and the database server 170 can be configured to share the processing steps disclosed in, for example, any one of FIGS. 8, 9, 11, and 13 in various combinations. For example, the processes performed by the output destination provider 172 can be performed by the application distribution server 150. Similarly, the functionality of the output destination determiner 162 can be performed by the database server 170. Further, the illustrated elements of the application server 150 and the database server 170 can be combined into a single server apparatus, or divided between a plurality of machines in combinations other than that shown for example in FIG. 3.

In the above-described examples, the first terminal server 110 and the second terminal server 130, which have different architecture environments, are implemented by respective machines that are independent from each other. Alternatively, functions of the first terminal server 110 and the second terminal server 130 may be operated on the same machine, for example, as different virtual computers.

In the above-described examples, the first terminal server 110 is implemented by an information processing apparatus such as a PC, which provides a desktop environment to a plurality of users. Alternatively, the first terminal server 110 may be implemented by a plurality of virtual computers, which provide a function of remotely connecting a desktop environment provided by the first terminal server 110 to make the first terminal service to be available to the user.

As described above, the output distribution system 100 includes a server environment in which a virtual printer driver operates, which is capable of identifying a client terminal currently operated by the end user to determine an output destination even when the end user accesses the server environment through environments having different architecture. The server environment further distributes a print job to the output destination to cause the output destination to process the print job.

In one example, the output distribution system includes a server environment that provides services to a client terminal. The server environment includes a connection relay server providing the connection relay function, an output destination information providing server providing the output destination information providing function, and an output distribution server providing the output distribution function. In one example, the connection relay server, which may be referred to as a connection relay apparatus, corresponds to the service connection relay 132 of the second terminal server 130 or the second terminal server 130 including the service connection relay 132. The output destination information providing server, which may be referred to as an output destination information providing apparatus, corresponds to the database server 170. The output distribution server, which may be referred to as an output distribution apparatus, corresponds to the output distribution software 154 operating on the application distribution server 150 or the application distribution server 150 that operates according to the output distribution software 154.

The connection relay apparatus relays connection of a terminal with a first terminal server. The first terminal server, which may be referred to as a first terminal server apparatus, corresponds to the first terminal server 110. For example, the service connection relay 132 of the second terminal server 130 relays connection of a terminal, such as a thin client terminal, with the first terminal server 110.

The output distribution apparatus includes: extracting means for extracting user-specific information from an output request received from the terminal via the connection relay apparatus; requesting means for requesting the output destination information providing apparatus to provide output destination information indicating an output destination candidate to process the output request based on the user-specific information; and transmitting means for transmitting drawing data generated based on the output request to an output destination that is determined based on the output destination information received from the output destination information providing apparatus.

For example, the output distribution apparatus is implemented by the output distribution software 154 operating on the application distribution server 150, or the application distribution server 150 that operates in cooperation with the output distribution software 154. The extracting means corresponds to the virtual printer driver 156, which may be implemented by the MPU 12 and the memory. The requesting means corresponds to the output destination determiner 162, which may be implemented by the MPU 12 and the memory, which operates in cooperation with the network I/F 34. The transmitting means corresponds to the data transmit 160, which may be implemented by the network I/F 34 under control of the MPU 12.

The output destination providing apparatus includes: inquiry means for inquiring the connection relay apparatus to obtain association data indicating the association between the user-specific information and terminal; specifying means for specifying a terminal that corresponds to the user-specific information based on the association data received from the connection relay apparatus; and providing means for providing terminal-specific information indicating the specified terminal as the output destination information to the output distribution apparatus.

For example, the inquiry means corresponds to the terminal association data inquiry 174, which may be implemented by the network I/F 34 under control of the MPU 12. The specifying means corresponds to the output destination provider 172, which may be implemented by the MPU 12 and the memory. The providing means corresponds to the output destination provider 172, which may be implemented by the network I/F 34 under control of the MPU 12.

For example, the user-specific information includes information for uniquely identifying a login user who operates the terminal that remotely connects a first desktop environment provided by the first terminal server apparatus through the connection relay apparatus.

The output distribution system further includes the first terminal server apparatus that provides the first desktop environment to the terminal, which is connected to the first terminal server apparatus directly or via the connection relay apparatus. The inquiring means of the output destination information providing apparatus inquiries the first terminal server apparatus to obtain information regarding the terminal that directly connects the first terminal server apparatus.

For example, the connection relay apparatus may be a second terminal server apparatus that provides a second desktop environment to the terminal. The second desktop environment has an architecture different from an architecture of the first desktop environment provided by the first terminal server apparatus. The second terminal server apparatus includes means for causing the first desktop environment to be available to the user through the second desktop environment.

For example, in the output distribution system, the connection relay apparatus establishes a first session based on a first remote connections protocol with the first terminal server apparatus, and a second session based on a second remote connections protocol with the terminal.

For example, in the output distribution system, the terminal specific information includes at least one of a terminal name of the terminal, an IP address of the terminal, an MAC address of the terminal, a serial number of the terminal, and a UUID of the terminal, and the user specific information includes at least one of a user name of the user, a user ID of the user, and a token ID of a token assigned to the user.

For example, in the output distribution system, the first remote connections protocol is a remote desktop protocol, and the second remote connections protocol is an application link protocol.

In one example, the present invention may reside in an output distribution apparatus connected to an output destination information providing apparatus via a network. The output distribution apparatus includes: extracting means for extracting user-specific information from an output request received from a terminal via a connection relay apparatus that relays connection of the terminal with a first terminal server apparatus; requesting means for requesting the output destination information providing apparatus to provide output destination information indicating an output destination candidate to process the output request based on the user-specific information; and transmitting means for transmitting drawing data generated based on the output request to an output destination determined based on the output destination information received from the output destination information providing apparatus. The output destination information providing apparatus inquiries the connection relay apparatus for association data indicating the association between the user-specific information and the terminal, specifies a terminal that corresponds to the user-specific information based on the association data received from the connection relay apparatus, and provides terminal-specific information indicating the specified terminal as the output destination information to the output distribution apparatus.

In one example, the present invention may reside in an output distribution providing apparatus connected to an output distribution apparatus. The output distribution apparatus extracts user-specific information from an output request received from a terminal via a connection relay apparatus that relays connection of the terminal with a first terminal server apparatus, requests the output destination information providing apparatus to provide output destination information indicating an output destination candidate to process the output request based on the user-specific information, and transmits drawing data generated based on the output request to an output destination determined based on the output destination information received from the output destination information providing apparatus. The output distribution providing apparatus includes: inquiry means for inquiring the connection relay apparatus for association data indicating the association between the user-specific information and the terminal; specifying means for specifying a terminal that corresponds to the user-specific information based on the association data received from the connection relay apparatus; and providing means for providing terminal-specific information indicating the specified terminal as the output destination information to the output distribution apparatus.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer executable program stored in any kind of storage medium. The computer executable program may be written by any desired program language such as a legacy programming language including assembler, C, C++, C#, or Java (Registered Trademark), or an object directed programming language. Examples of storage mediums include, but are not limited to, flexible disk, hard disk, optical discs such as CD-ROM, CD-RW, DVD-ROM, DV-RAM, DVD-RW, and blue disc, magneto-optical discs, magnetic tapes, nonvolatile memory cards such as SD cards, ROM (read-only-memory), EEPROM, EPROM, flash memory, etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

Further, each of the plurality of computing devices is configured to communicate with one or more external computing devices using any type of communication link, including any combination of wired and wireless communication links; using any type of network, including the Internet, a wide-area network (WAN), a local-area network (LAN), and a virtual private network (VPN); and using any combination of transmission techniques and communication protocols.

In one example, the present invention may reside in an output distribution system including an output distribution server apparatus and a database server apparatus. The output distribution server apparatus includes: a first processor configured to extract user-specific information from job data, the job data being generated in response to an output request input by a user using a terminal that accesses services provided by a first terminal server apparatus via a second terminal server apparatus, and request a database server apparatus to provide output destination information based on the user-specific information of the job data; and a first interface configured to transmit drawing data of the job data to an output destination determined based on the output destination information to cause the output destination to process the job data based on the output request. The database server apparatus includes: a second interface configured to send an inquiry to the second terminal server apparatus to obtain association data indicating an association between user-specific information and terminal-specific information, the association information being managed by the second terminal server apparatus; a second processor configured to obtain, using the association data, terminal-specific information that identifies a terminal associated with the user specified by the user-specific information; and a third interface configured to send, to the output distribution server apparatus, the terminal-specific information indicating the terminal associated with the user specified by the user-specific information, as the output destination information.

In one example, the present invention may reside in an output distribution system including an output distribution server apparatus and a database server apparatus. The output distribution server apparatus includes: a first interface configured to exchange first data with a terminal, which accesses services provided by a first terminal server apparatus via a second terminal server apparatus; a second interface configured to exchange second data with a database server apparatus; and a first processor configured to determine, in cooperation with the database server apparatus and in response to an output request, an output destination for job data. The database server apparatus includes: a second interface configured to exchange the second data with the output distribution server apparatus; and a second processor configured to share processing with the first processor so as to determine the output destination for the job data in response to the output request. The first and second processors are configured to share processing with each other, each processor performing a portion of the processing so that together the first and second processors are configured to (1) extract user-specific information from the job data, the job data being generated in response to the output request, which is input by a user using the terminal; (2) send an inquiry to the second terminal server to obtain association data indicating an association between user-specific information and terminal-specific information, the association information being managed by the second terminal server; (3) obtain, using the association data, terminal-specific information that identifies a terminal associated with the user specified by the user-specific information; and (4) transmit drawing data of the job data to an output destination determined based on the identified terminal associated with the user to cause the output destination to process the job data based on the output request.

In one example, the present invention may reside in an output distribution system including: a first processing device configured to extract user-specific information from job data, the job data being generated in response to an output request input by a user using a terminal that accesses services provided by a first terminal server apparatus via a second terminal server apparatus; a second processing device configured to determine output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus, wherein the second processing device is configured to transmit an inquiry to the second terminal server apparatus to obtain the association data; and determine the output destination information based on terminal-specific information that identifies a terminal associated with the user specified by the user-specific information, the terminal-specific information being obtained using the association data; and a transmitter configured to transmit drawing data of the job data to an output destination based on the output destination information determined by the second processing device to cause the output destination to process the job data based on the output request.

In one example, the present invention may reside in an output distribution system including an output distribution server apparatus and a database server apparatus. The output distribution server apparatus includes: means for extracting user-specific information from job data, the job data being generated in response to an output request input by a user using a terminal that accesses services provided by a first terminal server apparatus via a second terminal server apparatus, and for requesting a database server apparatus to provide output destination information based on the user-specific information of the job data; and means for transmitting drawing data of the job data to an output destination determined based on the output destination information to cause the output destination to process the job data based on the output request. The database server apparatus includes: means for sending an inquiry to the second terminal server apparatus to obtain association data indicating an association between user-specific information and terminal-specific information, the association information being managed by the second terminal server apparatus; means for obtaining, using the association data, terminal-specific information that identifies a terminal associated with the user specified by the user-specific information; and means for sending, to the output distribution server apparatus, the terminal-specific information indicating the terminal associated with the user specified by the user-specific information, as the output destination information.

In one example, the present invention may reside in an output distribution server apparatus including: a processor configured to extract user-specific information from job data, the job data being generated in response to an output request input by a user using a terminal that accesses services provided by a first terminal server apparatus via a second terminal server apparatus; and request a database server apparatus to provide output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus; and an interface configured to transmit drawing data of the job data to an output destination determined based on the output destination information to cause the output destination to process the job data based on the output request.

In one example, the present invention may reside in an output distribution server apparatus including: a first interface configured to exchange first data with a terminal, which accesses services provided by a first terminal server apparatus via a second terminal server apparatus; a second interface configured to exchange second data with a database server apparatus; and a processor configured to determine, in response to an output request, an output destination for job data, wherein the processor is configured to at least one of (1) extract user-specific information from the job data, the job data being generated in response to the output request, which is input by a user using the terminal; (2) send an inquiry to the second terminal server apparatus to obtain association data indicating an association between user-specific information and terminal-specific information, the association information being managed by the second terminal server apparatus; (3) obtain, using the association data, terminal-specific information that identifies a terminal associated with the user specified by the user-specific information; and (4) transmit drawing data of the job data to an output destination determined based on the identified terminal associated with the user to cause the output destination to process the job data based on the output request, wherein a processor of the database server apparatus is configured to perform the above processing operations that are not performed by the output distribution server apparatus.

In one example, the present invention may reside in a database server apparatus including: a first interface configured to receive, from an output distribution server apparatus, a request to obtain output destination information based on user-specific information extracted from job data, the job data being generated in response to an output request input by a user using a terminal that accesses services provided by a first terminal server apparatus via a second terminal server apparatus; a second interface configured to send an inquiry to the second terminal server apparatus to obtain association data indicating an association between user-specific information and terminal-specific information, the association information being managed by the second terminal server apparatus; a processor configured to obtain, using the association data, terminal-specific information that identifies a terminal associated with the user specified by the user-specific information; and a third interface configured to send, to the output distribution server apparatus, the terminal-specific information indicating the terminal associated with the user specified by the user-specific information, as the output destination information to cause the output distribution server apparatus to transmit drawing data of the job data to an output destination determined based on the output destination information.

In one example, the present invention may reside in: an output distribution method including: extracting user-specific information from job data, the job data being generated in response to an output request input by a user using a terminal that accesses services provided by a first terminal server apparatus via a second terminal server apparatus; requesting output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus; sending an inquiry to the second terminal server apparatus to obtain the association data; determining the output destination information based on terminal-specific information that identifies a terminal associated with the user specified by the user-specific information, the terminal-specific information being obtained using the association data; and transmitting drawing data of the job data to an output destination based on the output destination information determined in the determining step to cause the output destination to process the job data based on the output request.

In one example, the present invention may reside in a method, which may be performed by a distribution server apparatus. The method includes: extracting user-specific information from job data, the job data being generated in response to an output request input by a user using a terminal that accesses services provided by a first terminal server apparatus via a second terminal server apparatus; requesting a database server apparatus to provide output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus; and transmitting drawing data of the job data to an output destination determined based on the output destination information to cause the output destination to process the job data based on the output request.

In one example, the present invention may reside in a method, which may be performed by a database server apparatus. The method includes: receiving, from an output distribution server apparatus, a request to obtain output destination information based on user-specific information extracted from job data, the job data being generated in response to an output request input by a user using a terminal that accesses services provided by a first terminal server apparatus via a second terminal server apparatus; sending an inquiry to the second terminal server apparatus to obtain association data indicating an association between user-specific information and terminal-specific information, the association information being managed by the second terminal server apparatus; obtaining, using the association data, terminal-specific information that identifies a terminal associated with the user specified by the user-specific information; and sending, to the output distribution server apparatus, the terminal-specific information indicating the terminal associated with the user specified by the user-specific information, as the output destination information to cause the output distribution server apparatus to transmit drawing data of the job data to an output destination determined based on the output destination information.

In one example, the present invention may reside in a non-transitory recording medium storing a plurality of instructions which, when executed by a processor, cause the processor to perform an output distribution method including: extracting user-specific information from job data, the job data being generated in response to an output request input by a user using a terminal that accesses services provided by a first terminal server apparatus via a second terminal server apparatus; requesting output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus; sending an inquiry to the second terminal server apparatus to obtain the association data; determining the output destination information based on terminal-specific information that identifies a terminal associated with the user specified by the user-specific information, the terminal-specific information being obtained using the association data; and transmitting drawing data of the job data to an output destination based on the output destination information determined in the determining step to cause the output destination to process the job data based on the output request.

In one example, the present invention may reside in a non-transitory recording medium storing a plurality of instructions which, when executed by a processor, cause the processor to perform a method including: extracting user-specific information from job data, the job data being generated in response to an output request input by a user using a terminal that accesses services provided by a first terminal server apparatus via a second terminal server apparatus; requesting a database server apparatus to provide output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus; and transmitting drawing data of the job data to an output destination determined based on the output destination information to cause the output destination to process the job data based on the output request.

In one example, the present invention may reside in a non-transitory recording medium storing a plurality of instructions which, when executed by a processor, cause the processor to perform a method including: receiving, from an output distribution server apparatus, a request to obtain output destination information based on user-specific information extracted from job data, the job data being generated in response to an output request input by a user using a terminal that accesses services provided by a first terminal server apparatus via a second terminal server apparatus; sending an inquiry to the second terminal server apparatus to obtain association data indicating an association between user-specific information and terminal-specific information, the association information being managed by the second terminal server apparatus; obtaining, using the association data, terminal-specific information that identifies a terminal associated with the user specified by the user-specific information; and sending, to the output distribution server apparatus, the terminal-specific information indicating the terminal associated with the user specified by the user-specific information, as the output destination information to cause the output distribution server apparatus to transmit drawing data of the job data to an output destination determined based on the output destination information.

What is claimed is:

1. An output distribution system, comprising:
   a first processing device configured to extract user-specific information from job data, the job data being generated in response to an output request input by a user using a terminal that accesses services provided by a first terminal server apparatus via a second terminal server apparatus;
   a second processing device configured to determine output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus, wherein the second processing device is configured to
      transmit an inquiry to the second terminal server apparatus to obtain the association data; and
      determine the output destination information based on terminal-specific information that identifies a terminal associated with the user specified by the user-specific information, the terminal-specific information being obtained using the association data; and
   a transmitter configured to transmit drawing data of the job data to an output destination based on the output destination information determined by the second processing device to cause the output destination to process the job data based on the output request.

2. The output distribution system of claim 1, further comprising:
   the first terminal server apparatus configured to provide services including a first desktop environment to the user at the terminal, the terminal being connected to the first terminal server apparatus directly or via a connection relay of the second terminal server apparatus, wherein the second interface is further configured to obtain association data indicating an association between user-specific information and terminal-specific information that is managed by the first terminal server apparatus, from the first terminal server apparatus.

3. The output distribution system of claim 2, further comprising:
   the second terminal server apparatus configured to provide services including a second desktop environment to the user at the terminal, the second desktop environment having an architecture different from an architecture of the first desktop environment provided by the first terminal server apparatus, wherein
   the connection relay of the second terminal server apparatus causes the first desktop environment to be available to the user at the terminal through the second desktop environment.

4. The output distribution system of claim 3, further comprising:
   the terminal configured to receive the output request input by the user and to send the output request to an output distribution server apparatus via the first terminal server apparatus and the second terminal server apparatus.

5. The output distribution system of claim 4, wherein
   the connection relay of the second terminal server apparatus establishes a first session based on a first remote connections protocol with the first terminal server apparatus, and a second session based on a second remote connections protocol with the terminal.

6. The output distribution system of claim 5, wherein the first remote connections protocol is a remote desktop protocol, and the second remote connections protocol is an application link protocol.

7. The output distribution system of claim 1, wherein the user-specific information includes information that uniquely identifies a login user who operates the terminal that remotely connects a first desktop environment provided by the first terminal server apparatus through a connection relay of the second terminal server apparatus.

8. The output distribution system of claim 1, wherein the terminal-specific information includes at least one of a terminal name of the terminal, an IP address of the terminal, an MAC address of the terminal, a serial number of the terminal, and a UUID of the terminal, and
   the user-specific information includes at least one of a user name of the user, a user ID of the user, and a token ID of a token assigned to the user.

9. An output distribution method, comprising:
   extracting user-specific information from job data, the job data being generated in response to an output request input by a user using a terminal that accesses services provided by a first terminal server apparatus via a second terminal server apparatus;
   requesting output destination information based on the user-specific information of the job data, wherein the output destination information includes terminal-specific information for identifying a terminal that is associated with the user specified by the user-specific information of the job data, the terminal-specific information being obtained using association data indicating an association between user-specific information and terminal-specific information, the association information being managed by the second terminal server apparatus;
   sending an inquiry to the second terminal server apparatus to obtain the association data;
   determining the output destination information based on terminal-specific information that identifies a terminal associated with the user specified by the user-specific information, the terminal-specific information being obtained using the association data; and transmitting drawing data of the job data to an output destination based on the output destination information determined in the determining step to cause the output destination to process the job data based on the output request.

10. The output distribution method of claim 9, further comprising:

providing services including a first desktop environment to the user at the terminal, directly using the first terminal server apparatus or via a connection relay of the second terminal server apparatus.

11. The output distribution method of claim 10, further comprising:

providing services including a second desktop environment to the user at the terminal using the second terminal server apparatus, the second desktop environment having an architecture different from an architecture of the first desktop environment.

* * * * *